(12) United States Patent
Xiu et al.

(10) Patent No.: US 10,939,096 B2
(45) Date of Patent: Mar. 2, 2021

(54) CONTROL-POINT BASED INTRA DIRECTION REPRESENTATION FOR INTRA CODING

(71) Applicant: Interdigital Madison Patent Holdings, SAS, Paris (FR)

(72) Inventors: Xiaoyu Xiu, San Diego, CA (US); Yuwen He, San Diego, CA (US); Yan Ye, San Diego, CA (US)

(73) Assignee: Interdigital Madison Patent Holdings, SAS, Paris (FR)

(*) Notice: Subject to any disclaimer, the term of this patent is extended or adjusted under 35 U.S.C. 154(b) by 56 days.

(21) Appl. No.: 16/097,115

(22) PCT Filed: May 4, 2017

(86) PCT No.: PCT/US2017/031133
§ 371 (c)(1),
(2) Date: Oct. 26, 2018

(87) PCT Pub. No.: WO2017/192898
PCT Pub. Date: Nov. 9, 2017

(65) Prior Publication Data
US 2019/0104303 A1 Apr. 4, 2019

Related U.S. Application Data

(60) Provisional application No. 62/332,357, filed on May 5, 2016.

(51) Int. Cl.
*H04N 19/105* (2014.01)
*H04N 19/593* (2014.01)
(Continued)

(52) U.S. Cl.
CPC ........... *H04N 19/105* (2014.11); *H04N 19/11* (2014.11); *H04N 19/147* (2014.11);
(Continued)

(58) Field of Classification Search
CPC .... H04N 19/105; H04N 19/11; H04N 19/147; H04N 19/176; H04N 19/182; H04N 19/463; H04N 19/59; H04N 19/593
See application file for complete search history.

(56) References Cited

FOREIGN PATENT DOCUMENTS

| WO | 2011083439 | 7/2011 | |
|----|------------|--------|---|
| WO | WO-2011083439 A1 * | 7/2011 | ............. H04N 19/61 |
| WO | 2017192995 A1 | 11/2017 | |

OTHER PUBLICATIONS

Rapporteur Q6/16: "Future video coding: Joint Exploration Model 1 (JEM1) for future video coding investigation", ITU-T SG16 Meeting; Oct. 12-23, 2015: Geneva, No. T13-SG16-151012-TD-WP3-0213, Oct. 21, 2015, XP030100762 (Year: 2015).*

(Continued)

*Primary Examiner* — Sath V. Perungavoor
*Assistant Examiner* — Tyler B Edwards
(74) *Attorney, Agent, or Firm* — Invention Mine LLC

(57) ABSTRACT

Systems and methods are described for control-point based intra mode for coding a video bitstream. In an exemplary embodiment, at least two control points in a picture are selected. The control points may be, for example, points at or adjacent to two or more corners of a current block. For each of the control points, an associated intra prediction direction is identified. The intra prediction directions may be encoded in the bitstream, e.g. using differential coding. A derived intra prediction direction is interpolated based on a position of a pixel (or of a block) relative to the control points, and the derived intra prediction direction is used to predict one or more samples in the video. Different interpolation techniques, such as triangular interpolation or bilinear interpolation may be used.

20 Claims, 17 Drawing Sheets

(51) Int. Cl.
H04N 19/182 (2014.01)
H04N 19/176 (2014.01)
H04N 19/147 (2014.01)
H04N 19/11 (2014.01)
H04N 19/463 (2014.01)
H04N 19/59 (2014.01)

(52) U.S. Cl.
CPC ......... *H04N 19/176* (2014.11); *H04N 19/182* (2014.11); *H04N 19/463* (2014.11); *H04N 19/59* (2014.11); *H04N 19/593* (2014.11)

(56) References Cited

OTHER PUBLICATIONS

Rapporteur Q6/16: "Future video coding: Joint Exploration Model 1 (JEM1) for future video coding investigation", ITU-T SGl 6 Meeting; Oct. 12-23, 2015: Geneva, No. T13-SG16-151012-TD-WP3-0213, Oct. 21, 2015, XP030100762 (Year: 2015).*

International Search Report and Written Opinion of the International Searching Authority for PCT/US2017/031133 dated Jul. 4, 2017, 15 pages.

Lainema, J., et. al., "Intra Picture Coding with Planar Representations". In the 28th Picture Coding Symposium, Dec. 1, 2010, pp. 198-201.

Rapporteur Q6/16, "Future Video Coding: Joint Exploration Model 1 (JEMI) For Future Video Coding Investigation". Telecommunication Standardization Sector, ITU-T SG16 meeting, Dec. 10, 2015, pp. 1-20.

International Preliminary Report on Patentability for PCT/US2017/031133 dated Nov. 6, 2018.

International Telecommunication Union, "Advanced Video Coding for Generic Audiovisual Services". Series H: Audiovisual and Multimedia System; Infrastructure of audiovisual services, Coding of moving video, ITU-T Recommendation H.264, ISO/IEC/MPEG 4 Part 10, Nov. 2007, 564 pages.

SMPTE 421M, "VC-1 Compressed Video Bitstream Format and Decoding Process". SMPTE Standard, (2006), 493 pages.

Bross, B., et. al., "High Efficiency Video Coding (HEVC) Text Specification Draft 10". Joint Collaborative Team on Video Coding, JCTVC-L1003, version 34, Jan. 2013.

Chen, J., et. al. "Coding Tools Investigation for Next Generation Video Coding". Proceedings of SPIE, vol. 9599, (2015), 9 pages.

Alshina, E., et. al., "Known Tools Performance Investigation for Next Generation Video Coding". VCEG-AZ05, Jun. 2015, 7 pages.

Karczewicz, M., et. al., "Report of AHG1 On Coding Efficiency Improvements". VCEG-AZ01, Jun. 2015, 2 pages.

Ohm, J.-R., et. al., "Report of AHG On Future Video Coding Standardization Challenges", M36782, Jun. 2015, 6 pages.

Alshina, E., el al., "Known Tools Performance Investigation for Next Generation Video Coding". VCEG-AZ05, powerpoint presentation, Jun. 2015, 9 pages.

* cited by examiner

CONTROL-POINT BASED INTRA DIRECTION REPRESENTATION FOR INTRA CODING

CROSS-REFERENCE TO RELATED APPLICATIONS

The present application is a national stage application under 35 U.S.C. 371 of International Application No. PCT/US2017/031133, entitled "SYSTEMS AND METHODS FOR INTRA CODING WITH CONTROL-POINT BASED INTRA DIRECTION REPRESENTATION", filed on May 4, 2017, which claims benefit under 35 U.S.C. § 119(e) from U.S. Provisional Patent Application Ser. No. 62/332,357, filed May 5, 2016, entitled "SYSTEMS AND METHODS FOR INTRA CODING WITH CONTROL-POINT BASED INTRA DIRECTION REPRESENTATION," all of which are incorporated herein by reference in their entirety.

BACKGROUND

Video coding systems are widely used to compress digital video signals to reduce the storage requirements and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG1/2/4 part 2, H.264/MPEG-4 part 10 AVC, VC-1, and the latest video coding standard called High Efficiency Video Coding (HEVC), which was developed by JCT-VC (Joint Collaborative Team on Video Coding) of ITU-T/SG16/Q.6/VCEG and ISO/IEC/MPEG.

The first version of the HEVC standard was finalized in October 2013 and offers approximately 50% bit-rate saving or equivalent perceptual quality compared to the prior generation video coding standard H.264/MPEG AVC. Although the HEVC standard provides significant coding improvements over its predecessor, there is evidence that superior coding efficiency can be achieved with additional coding tools over HEVC. Recently, both VCEG and MPEG started the exploration work of new coding technologies for future video coding standardization. In October 2015, ITU-T VECG and ISO/IEC MPEG formed the Joint Video Exploration Team (JVET) to begin significant study of advanced technologies that could enable substantial enhancement of coding efficiency over HEVC. In the same month, a software codebase, called Joint Exploration Model (JEM) was established for future video coding exploration work. The JEM reference software was based on HEVC Test Model (HM) that was developed by JCT-VC for HEVC. New developments in coding tools can be integrated into the JEM software and subjected to testing using JVET common test conditions (CTCs). Improved systems and methods for coding video data to further reduce storage and bandwidth requirements would be desirable for consumers and providers of digital video systems.

SUMMARY

Systems and methods are disclosed herein for intra coding based on control-point representation of prediction directions. The proposed systems and methods may improve the efficiency of intra coding by increasing the precision of intra prediction directions without increasing the overhead of signaling block partitions and intra prediction modes. In an exemplary method, the intra prediction direction of samples inside a video block is derived from a set of controlling intra prediction directions for the current block. Additionally, a flag may be signaled to indicate whether the control-point based intra prediction is enabled or not. In case control-point based intra prediction is enabled, the intra modes of the control-points for the current block may be transmitted to the decoder, and the intra modes of the samples inside the block are derived from the control-point intra directions. In cases where the texture of the samples in the current block changes direction, control-point based intra prediction can provide a good estimate of the intra prediction directions for the samples inside the block. Systems and methods of control-point based intra prediction can make the use of relatively large intra coding units (CUs) and prediction units (PUs), therefore reducing the overhead used for signaling CU/PU partitions and intra direction information.

Exemplary methods are provided for encoding and/or decoding (collectively "coding") a video in a bitstream, where the video comprises a plurality of frames, each frame comprising blocks of samples. In one exemplary method, for at least a current block, at least a first intra direction is identified for a first control point and a second intra direction is identified for a second control point. For at least one current sample in the current block, an intra prediction direction is derived for the sample by interpolation based on the first intra direction and the second intra direction, and the sample is predicted with intra prediction using the derived intra prediction direction. The interpolation may be performed using bilinear interpolation, triangular interpolation, or other interpolation technique. In some embodiments, the interpolation of the intra prediction direction is further based on a third intra direction for a third control point. In some embodiments, positions of at least the first control point and the second control point are signaled in the bitstream. In some embodiments, at least the first intra prediction direction is signaled in the bitstream.

At least the first and second control points may be selected from the group consisting of: a first control point at the top-left corner of the block, a second control point at the top-right corner of the block, a third control point at the bottom-left corner of the block, a fourth control point at the bottom-right corner of the block, a custom control point signaled in the bitstream. In some embodiments, control points at one or more of the corners are shifted by one or more pixels to simplify division operations.

In some embodiments, the first control point is at a top-left corner of the current block and the second control point is at the top-right corner or bottom-left corner of the current block. The position of the second control point may be determined based on intra modes in a list of most probable modes for the current block. The second control point is selected to be at a top-right corner of the current block if more of the most probable modes are horizontal than vertical, and the second control point is selected to be at the bottom-left corner of the current block if more of the most probable modes are vertical than horizontal.

In some embodiments, the derived intra prediction direction is used for all samples in a sub-block. For example, where the current sample is in a current sub-block of the current block, all samples of the current sub-block may be predicted using the derived intra prediction direction. Different intra prediction directions may be derived for different sub-blocks of the current block.

In some embodiments, the first and second intra directions are selected from a list of most probable modes, the list being determined based on intra modes used to code neighboring blocks.

In some embodiments, the intra direction of at least one of the control points for the current block is included in a list of most probable modes for intra coding of a neighboring block.

In some embodiments, at least the second intra direction is coded in the bitstream using differential coding with respect to the first intra direction.

In some embodiments, at least the first intra direction is derived from samples in a template region adjacent to the control point.

In some embodiments, the use of control-point based intra coding for the current block is signaled by a flag in the bitstream at the block level.

Additional embodiments describe encoders and decoders operative to perform control-point based intra coding.

Systems and methods herein provide novel techniques for prediction of pixel values. Such techniques can be used by both encoders and decoders. Prediction of a pixel results in a pixel value that, in an encoding method, can be subtracted from an original pixel input value to determine a residual that is encoded in the bitstream. In a decoding method, a residual can be decoded from the bitstream and added to the predicted pixel value to obtain a reconstructed pixel that is identical to or approximates the original input pixel. Prediction methods as described herein thus improve the operation of video encoders and decoders by decreasing, in at least some implementations, the number of bits required to encode and decode video. Further benefits of exemplary prediction methods to the operation of video encoders and decoders are described in the Detailed Description.

BRIEF DESCRIPTION OF THE DRAWINGS

A more detailed understanding may be had from the following description, presented by way of example in conjunction with the accompanying drawings, which are first briefly described below.

FIG. 7A: original block; FIG. 7B: one CU partition; FIG. 7C: four CU partitions; FIG. 7D: CU+PU partition.

FIG. 11A: horizontal control-point selection; FIG. 11B: vertical control-point selection; FIG. 11C: diagonal control-point selection; FIG. 11D: anti-diagonal control-point selection.

FIG. 12A: derivation at the PU-level; FIG. 12B: derivation at the TU-level.

DETAILED DESCRIPTION

Exemplary Block-Based Encoding and Decoding Systems and Methods.

Embodiments disclosed herein, like the HEVC and JEM software, are built upon a block-based hybrid video coding framework.

Figure 1:
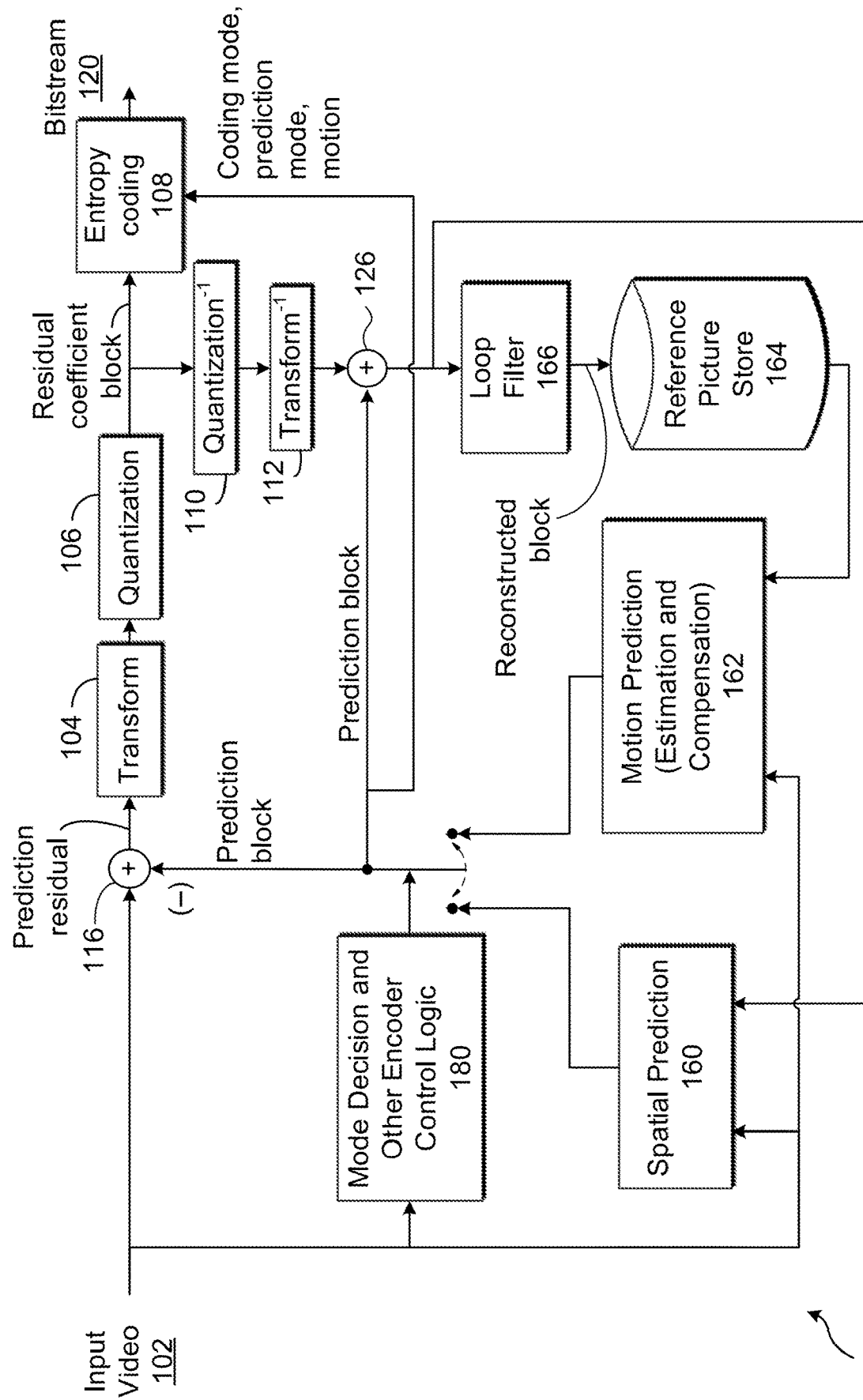
FIG. 1 is a functional block diagram illustrating an example of a block-based video encoder.

FIG. 1 is a functional block diagram of a block-based hybrid video encoding system. The input video signal 102 is processed block by block. In HEVC, extended block sizes (called a "coding unit" or CU) are used to efficiently compress high resolution (1080p and beyond) video signals. In HEVC, a CU can be up to 64×64 pixels, and bigger block size up to 256×256 for the encoding of large resolution videos (e.g. 720p and beyond) is allowed in JEM. A CU can be further partitioned into prediction units (PU), for which separate prediction methods are applied. For each input video block (MB or CU), spatial prediction (160) and/or temporal prediction (162) may be performed. Spatial prediction (or "intra prediction") uses pixels from the already coded neighboring blocks in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. A temporal prediction signal for a given video block is usually signaled by one or more motion vectors which indicate the amount and the direction of motion between the current block and its reference block. Also, if multiple reference pictures are supported (as is the case for the recent video coding standards such as H.264/AVC or HEVC), then for each video block, its reference picture index is sent additionally; and the reference index is used to identify from which reference picture in the reference picture store (164) the temporal prediction signal comes. After spatial and/or temporal prediction, the mode decision block (180) in the encoder chooses the best prediction mode, for example based on the rate-distortion optimization method. The prediction block is then subtracted from the current video block (116); and the prediction residual is de-correlated using transform (104) and quantized (106) to achieve the target bit-rate. The quantized residual coefficients are inverse quantized (110) and inverse transformed (112) to form the reconstructed residual, which is then added back to the prediction block (126) to form the reconstructed video block. Further in-loop filtering such as de-blocking filter and Adaptive Loop Filters may be applied (166) on the reconstructed video block before it is put in the reference picture store (164) and used to code future video blocks. To form the output video bit-stream 120, coding mode (inter or intra), prediction mode information, motion information, and quantized residual coefficients are all sent to the entropy coding unit (108) to be further compressed and packed to form the bit-stream.

Figure 2:
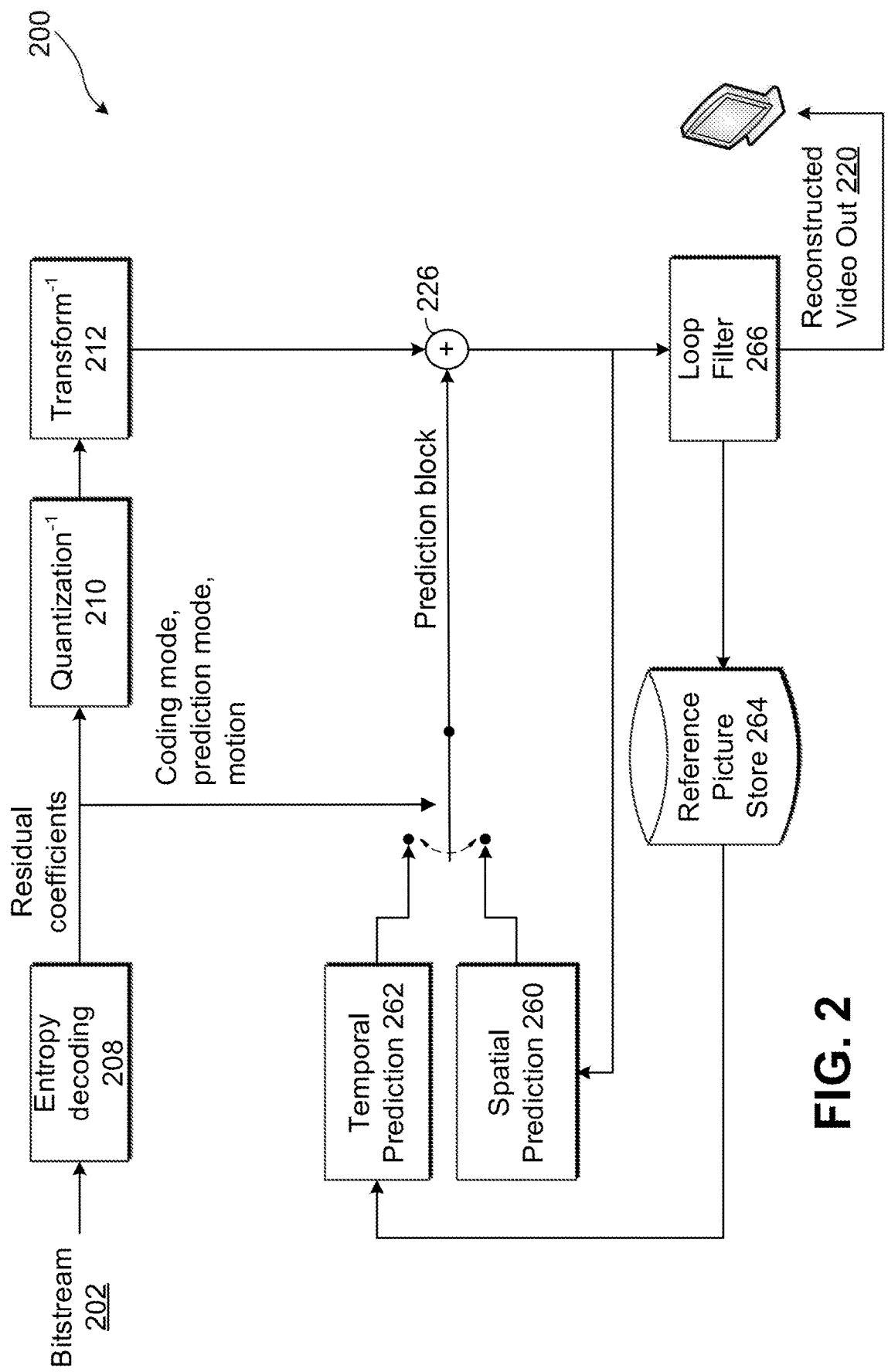
FIG. 2 is a functional block diagram illustrating an example of a block-based video decoder.

FIG. 2 is a functional block diagram of a block-based video decoder. The video bit-stream 202 is first unpacked and entropy decoded at entropy decoding unit 208. The coding mode and prediction information are sent to either the spatial prediction unit 260 (if intra coded) or the temporal prediction unit 262 (if inter coded) to form the prediction block. The residual transform coefficients are sent to inverse quantization unit 210 and inverse transform unit 212 to reconstruct the residual block. The prediction block and the residual block are then added together at 226. The reconstructed block may further go through in-loop filtering before it is stored in reference picture store 264. The reconstructed video is then sent out to drive a display device, as well as used to predict future video blocks.

Intra Coding Tools in HEVC.

HEVC incorporates several coding tools that improve the efficiency of intra prediction over preceding video coding standards. Those intra coding tools can more accurately model different directional texture as well as smooth regions with gradually changing sample values. Moreover, additional efforts were also made during the design to avoid the introduction of artificial edges with potential blocking artifacts by doing adaptive smoothing of reference samples and the boundary samples of the generated intra prediction for DC and directly horizontal and vertical directions.

The coding structure utilized for intra coding of HEVC closely follows the overall structure of the codec. Specifically, one picture is split into a number of CUs which represent the basic quad-tree splitting regions that are used to conduct intra coding. Inside one CU, multiple non-overlapping prediction units (PUs) can be defined, each of which specifies a region with individual intra prediction mode. In HEVC, one intra-coded CU may have two types of PU partitions, namely, PART_2N×2N and PART_N×N. PART_2N×2N indicates that all the samples in the CU are predicted by the same intra prediction mode and PART_N×N indicates that the CU is split into four equal size PUs each of which is predicted by its own intra prediction mode. A given PU can be further split into quad-tree of transform units (TUs), each of which is the basic operational unit of applying residual coding with a transform with the size of the TU. Additionally, in the HEVC specification, the prediction operations of all intra prediction modes in HEVC are defined on the TU basis to minimize the distance between predicted samples and reference samples used in prediction for improved efficiency of intra prediction.

Due to the number of possible intra prediction modes, HEVC considers five Most Probable Modes (MPMs) when coding luma intra prediction modes. Among the five MPMs, the first two are derived by detecting the intra prediction modes of the above and left neighboring blocks and the remaining three MPMs are defined as Planar, DC and vertical direction (26). Additionally, in cases where both above and left blocks have the same angular mode, two neighboring angular directions closest to that direction will also be included in the MPM list.

Figure 3:
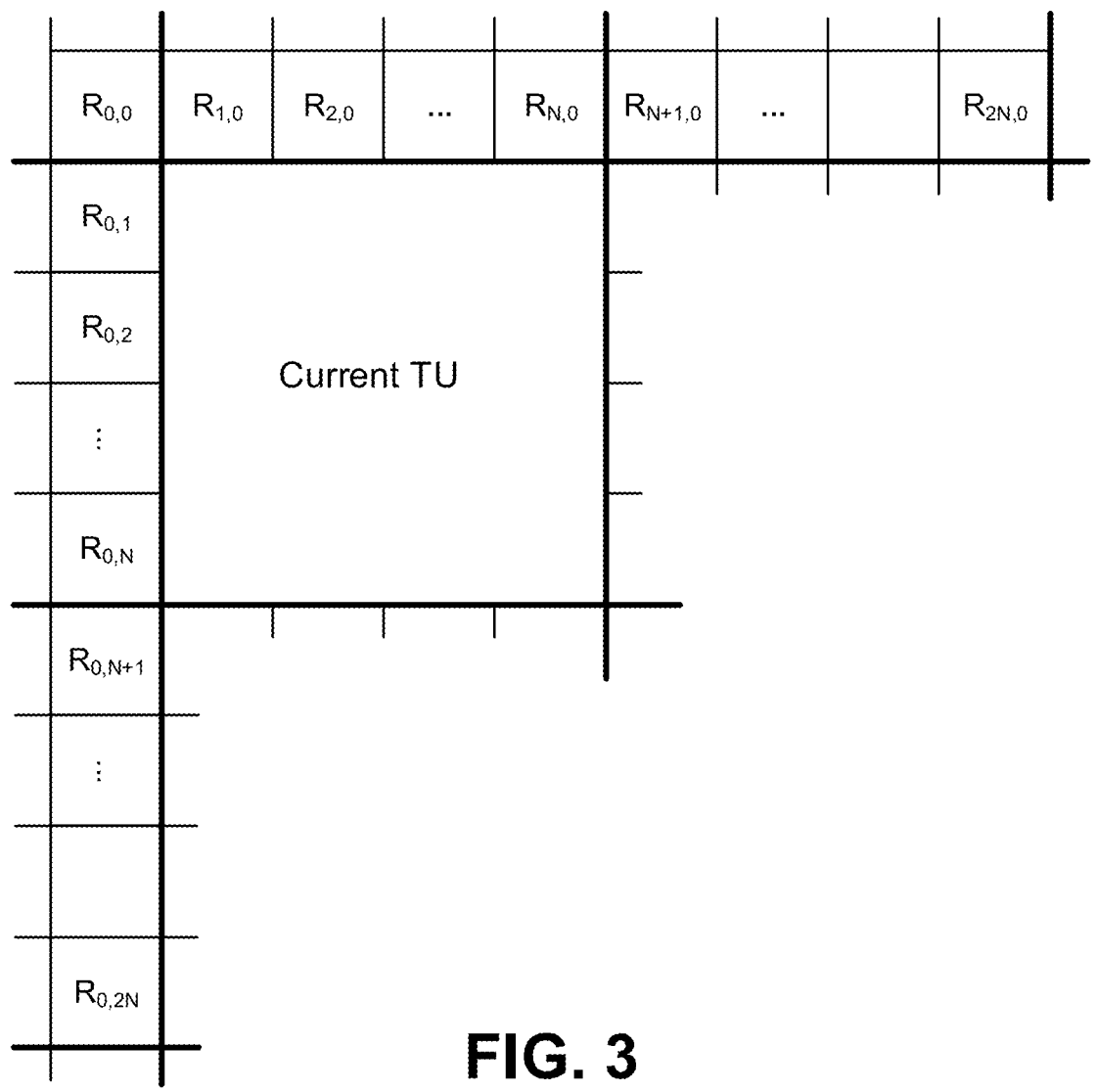
FIG. 3 is a diagram illustrating the notation used in the present disclosure to describe reference samples in intra prediction.
Figure 4:
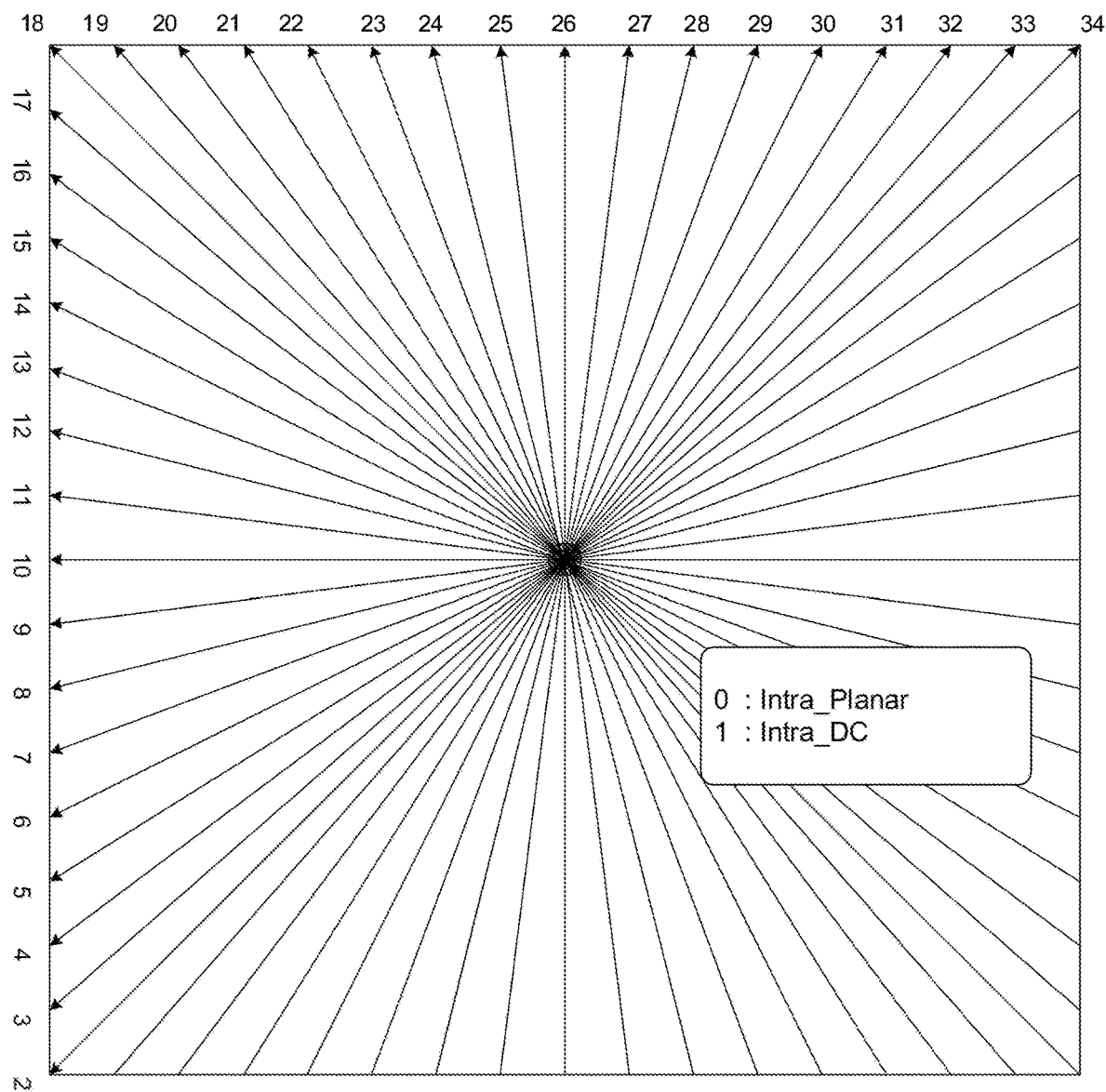
FIG. 4 is a diagram illustrating an example of 33 directional intra prediction modes and two non-directional intra prediction modes in HEVC.

Intra prediction modes. For all intra prediction modes in HEVC, the same set of previously decoded boundary samples from above and to the left of the current TU (as shown in FIG. 3) are used for prediction. Directional prediction with 33 different angular orientations are defined for various TU sizes ranging from 4×4 to 32×32. In addition to angular directions, planar prediction (which assumes a gradual changing surface with horizontal and vertical slope derived from boundaries) and DC prediction (which assumes a flat surface) can also be used. Table 1 specifies the mode index and intra prediction modes associated with each mode index. FIG. 4 illustrates the existing intra prediction modes as defined in HEVC. For chroma, the horizontal, vertical, planar and DC modes can be explicitly signaled in bitstream; additionally, chroma prediction mode can be indicated to be the same as luma prediction mode through DM mode.

TABLE 1

Specification of intra prediction modes.

| Index | Intra Prediction Mode |
|---|---|
| 0 | Planar |
| 1 | DC |
| 2 . . . 34 | Angular(N), N = 2, 3, . . . , 34 |

Reference sample smoothing. In HEVC, reference samples used for intra prediction are sometimes filtered by a 3-tap smoothing filter [1, 2, 1]/4, depending on TU size and the directionality of intra prediction. For 32×32 TUs, all angular modes except for direct horizontal and vertical use filtered reference samples. For 16×16 TUs, the intra modes that do not use filtered reference samples are extended to four modes (9, 11, 25 and 27) closest to horizontal and vertical. For 8×8 and smaller TUs, only diagonal modes (2, 18 and 34) use filtered reference for prediction. Additionally, reference smoothing is also applied to planar mode when the TU size is 8×8 or larger.

Intra coding tools in JEM. In general, the basic structure of HEVC intra coding remains unchanged in JEM with several modules associated with intra predictions being further extended and/or improved, including extended intra prediction directions, 4-tap intra interpolation, extended boundary smoothing, position-dependent intra prediction combination, mode-dependent non-separable secondary transform and adaptive reference filtering. In the following, several intra coding tools in JEM are briefly reviewed.

Figure 5:
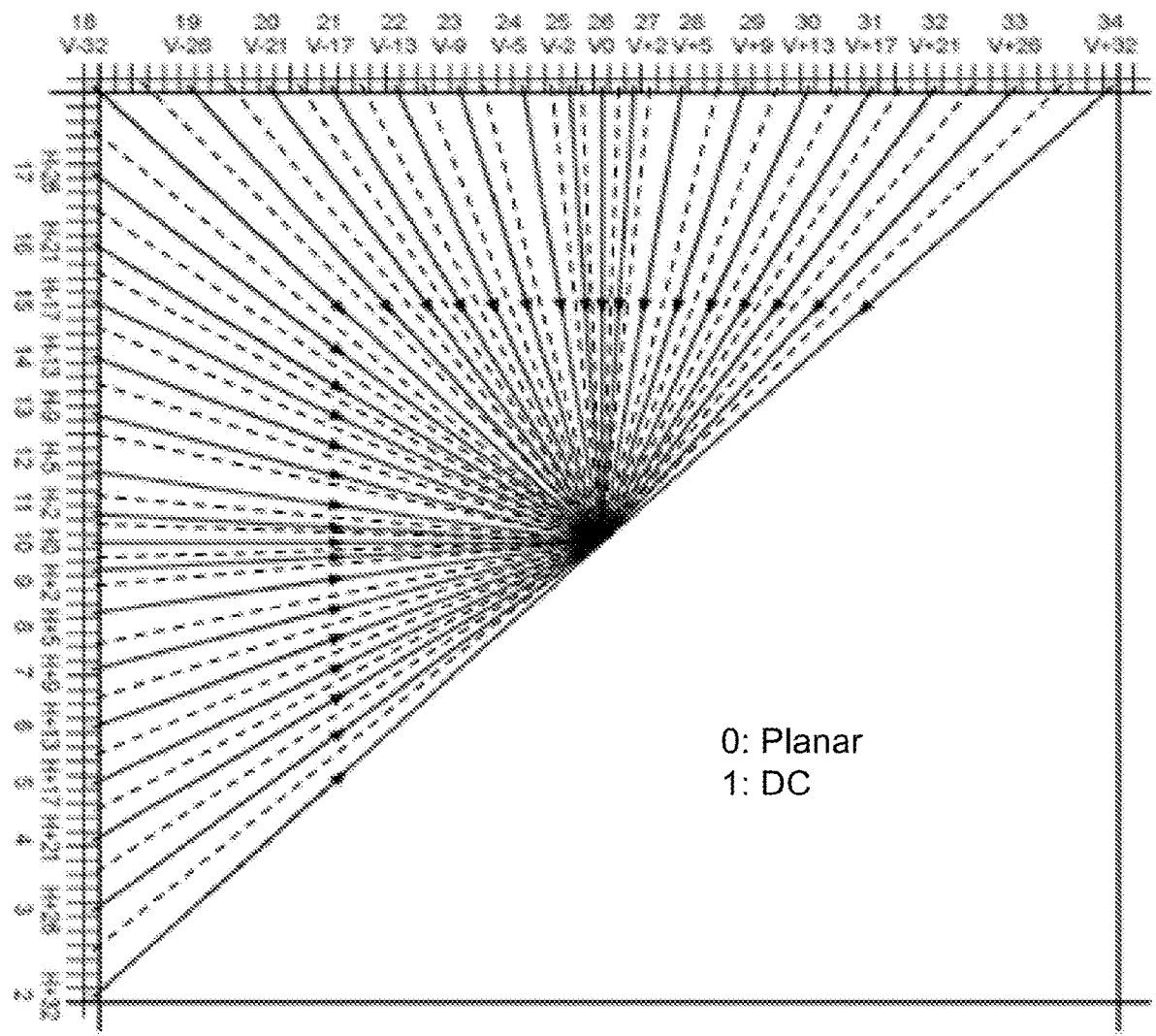
FIG. 5 is a diagram illustrating prediction directions for intra mode in JEM. The solid lines correspond to the HEVC intra mode directions, which are a subset of the JEM modes. The numbers are the mode numbers for HEVC.

Extended intra prediction directions. To capture finer edge directions presented in natural videos, in JEM, the number of the angular intra prediction modes is extended from 33 in HEVC to 65. FIG. 5 illustrates the intra prediction modes as defined in JEM where the new directional modes over HEVC are highlighted as dotted lines and the Planar and DC modes remain the same. Like HEVC, the extended directional intra prediction modes apply for all TU sizes and both luma and chroma intra predictions.

To accommodate the increased number of directional intra modes, an improved intra mode coding method uses six MPMs. To derive the set of six MPMs, the intra modes of the left and above neighboring blocks are checked. Instead of using the intra modes from top and left neighboring blocks directly as in HEVC, the most frequently used intra mode along the top neighboring row and along the left neighboring column are computed, and then used as the left and above neighboring modes, respectively. Next, to derive the actual 6 MPMs, the same rule used in HEVC is firstly applied to obtain 3 MPMs; then, the remaining 3 MPMs are defined as the 3 intra modes closest to (in terms of prediction direction) the angular modes which have already been included in the list of MPMs. Table 2 specifies the MPM derivation method currently used in JEM, where L and A specify the most frequently used intra prediction mode of the left and above neighboring blocks, respectively, and Max and Min specify the maximum and the minimum of the intra prediction modes of the left and the above neighboring blocks, respectively.

TABLE 2

Derivation of 6 MPMs in JEM.

| Conditions | | | MPM0 | MPM1 | MPM2 | MPM3 | MPM4 | MPM5 |
|---|---|---|---|---|---|---|---|---|
| L = A | L ≠ Planar and L ≠ DC | | L | Planar | L + 1 | L − 1 | L + 2 | DC |
|  | Otherwise | | Planar | DC | 26 (Ver) | 10 (Hor) | 2 | 18 |
| L ≠ A | L ≠ Planar and | L = DC or A = DC | L | A | Planar | Max − 1 | Max + 1 | Max + 2 |
|  | R ≠ Planar otherwise | otherwise | L | A | Planar | DC | Max + 1 | Min − 1 |
|  |  | L + A < 2 | L | A | 26 (Ver) | 10 (Hor) | 2 | 18 |
|  |  | otherwise | L | A | DC | Max − 1 | Max + 1 | Max + 2 |

Reference sample adaptive filtering. In HEVC intra prediction, a low-pass filter [1, 2, 1]/4 is used to smooth reference samples for some intra prediction modes. The number of the intra prediction modes to which smooth filtering is applied depends on the block size and prediction mode. Specifically, for 32×32 blocks, all angular modes except horizontal and vertical use a filtered reference; for 16×16 blocks, the modes not using a filtered reference are extended to the four modes (9, 11, 25, 27) closest to horizontal and vertical; for 8×8 blocks, only the diagonal modes (2, 18, 34) use a filtered reference. Smoothing is also applied where the planar mode is used, for block sizes 8×8 and larger.

Applying reference sample smoothing selectively based on the block size and directionality of the prediction may operate to reduce contouring artifacts caused by edges in the reference sample arrays. In JEM, in order to improve intra prediction efficiency, two sets of low-pass filters as below are applied by reference sample adaptive filtering (RASF) to smooth reference samples for intra prediction.

3-tap LPF with the coefficients of [1, 2, 1]/4, (default reference smoothing filter of HEVC), 5-tap LPF with the coefficients of [2, 3, 6, 3, 2]/16.

In order to maximize the gain that RSAF could achieve, the selection of two reference smoothing filters are performed on TU-level.

Data hiding is a technique mainly used for watermarking. In HEVC, this method is applied to hide the signs of the most significant coefficients of TU's coefficients groups (CGs) into the parity of absolute values of CG's coefficients, which is referred to as sign bits hiding (SBH). To reduce the overhead of RSAF flag signaling, data hiding is used to hide the flag that indicates whether the reference filtering is enabled for a given TU into the transform coefficients of that TU. In contrast to the SBH, which uses all the coefficient in a given TU, RSAF only uses those transform coefficients located at an odd positions within the TU to hide a value of the filtering flag.

Figure 6:
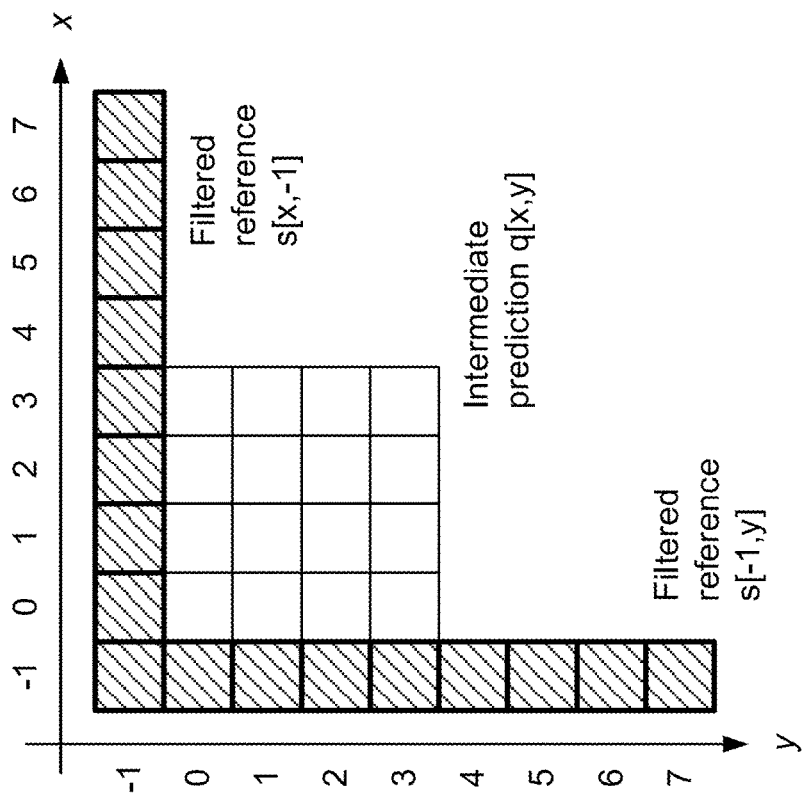
FIG. 6 is a schematic representation of a position-dependent intra prediction combination.
Figure 6:
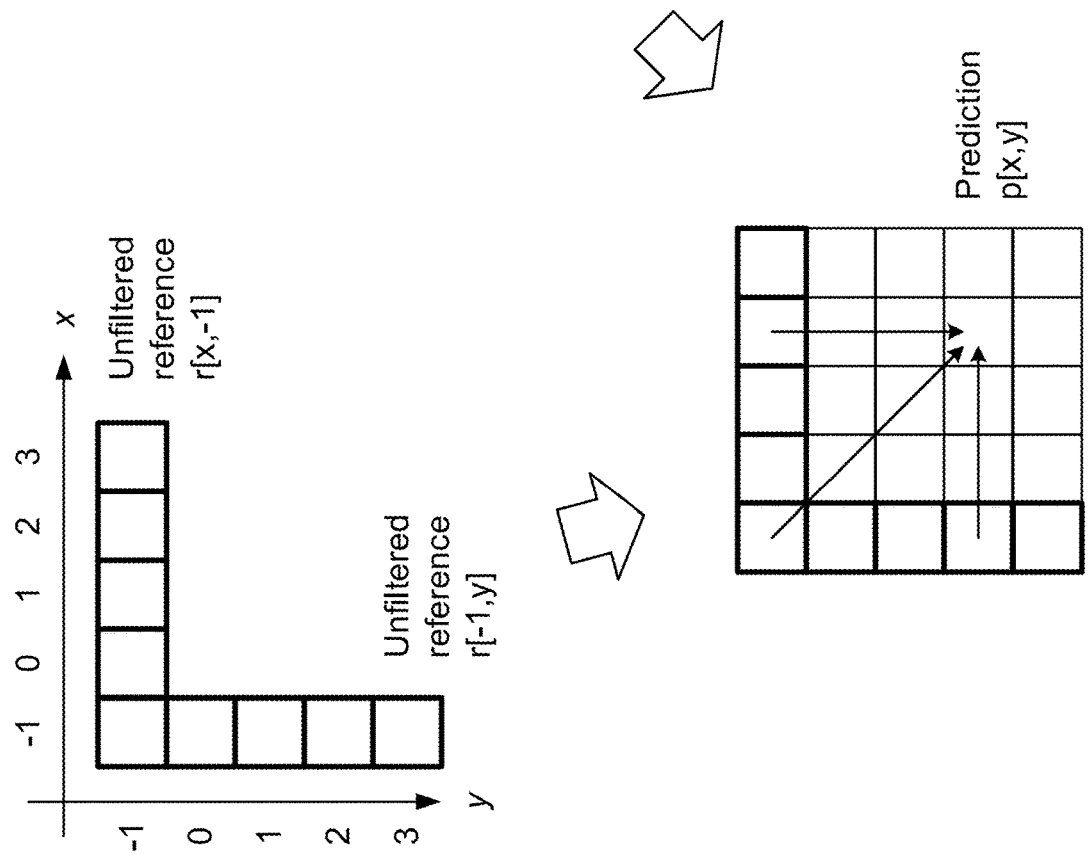

Position dependent intra prediction combination. In HEVC, intra prediction is computed from either a nonfiltered or a filtered set of reference border pixels, depending on the predictor mode and block size. The position dependent intra prediction combination (PDPC) extends this method by employing weighted combinations of filtered references and prediction samples calculated from unfiltered references, where the weights depend on predictor mode and pixel position. Based on the notation used to define the intra predictors as shown in FIG. 6, r and s represent the unfiltered and filtered reference samples, respectively. q[x,y] is the directional prediction derived from the filtered reference s as defined in HEVC but disabling boundary filters for DC, and direct horizontal and vertical intra directions. The values x and y are the horizontal and vertical distance from the block boundary. Using ">>" to represent right bit-shift operation, the new prediction p[x,y], which combines weighted values of unfiltered reference samples r[x,y] with the prediction signal q[x,y], is derived as $$p[x,y]=\{(c_1^{(v)}>>\lfloor y/d\rfloor)r[x,-1]-(c_2^{(v)}>>\lfloor y/d\rfloor)r[-1,-1]+\\(c_1^{(h)}>>\lfloor x/d\rfloor)r[-1,y]-(c_2^{(h)}>>\lfloor x/d\rfloor)r[-1,-1]+b\\[x,y]q[x,y]+64\}>>7 \quad (1)$$

where $c_1^v, c_2^v, c_1^h, c_2^h$ are predefined prediction parameters, d=1 for block sizes up to 16×16, and d=2 for larger blocks, and $$b[x,y]=128-(c_1^{(v)}>>\lfloor y/d\rfloor)+(c_2^{(v)}>>\lfloor y/d\rfloor)-(c_1^{(v)}>>\lfloor y/d\rfloor)+(c_2^{(h)}>>\lfloor y/d\rfloor) \quad (2)$$

is a normalization factor.

The filtered reference is derived by using binomial lowpass filters, since they can be easily adjusted for integer computations, and approximate Gaussian filters. The prediction parameters ($c_1^v, c_2^v, c_1^h, c_2^h$) and lowpass filter parameters are defined per prediction direction (neighboring prediction directions are grouped into 35 pairs) and block size. For each of 35 prediction direction pairs for a given block, 3 sets of prediction parameters and lowpass filters are predefined. The selected one from these 3 sets is signaled on the CU level.

Mode-dependent non-separable secondary transform. Due to the fact that the correlation between spatial neighboring samples is much less than that in temporal domain, there are usually strong correlations within the residual samples generated from intra prediction. In order to further improve intra coding efficiency, mode-dependent non-separable secondary transform (NSST) is applied in the current JEM. NSST applies non-separable transforms to each 4×4 transform coefficient block of intra prediction. Specifically, a CU-level index, valued from 0 to 3, is explicitly signaled to identify which pre-defined secondary transform is applied. If the index is zero, secondary transform is not used; otherwise, one of the three pre-defined 4×4 non-separable transforms is used. For each 4×4 coefficient block of one TU, the 4×4 non-separable transform identified by the CU-level index is applied. Additionally, the CU-level NSST flag is signaled only when there is at least one non-zero transform coefficient in the current CU.

To apply the non-separable transform, one 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad (3)$$

is first rearranged into a vector $\vec{X}$:

$$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T \quad (4)$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal).

Cross component prediction for chroma intra prediction. Coding performance can be improved by exploring the cross component correlation. In JEM the cross-component Linear Model (LM) prediction mode is used for chroma intra prediction. In LM prediction mode, the chroma samples are predicted based on reconstructed luma samples of the same block by using a linear model as follows:

$$\text{pred}_C(i,j) = \alpha \cdot \text{rec}_L(i,j) + \beta \quad (5)$$

where $\text{pred}_C(i,j)$ represents the prediction of chroma samples in a block and $\text{rec}_L(i,j)$ represents the reconstructed luma samples of the same block in the same resolution as chroma block, which may be down sampled for 4:2:0 chroma format content. Parameters $\alpha$ and $\beta$ are derived by minimizing regression error between the neighboring reconstructed luma and chroma samples around the current block.

Additionally, the LM prediction mode also exploits the correlation between two chroma components, i.e. Cr component is predicted from Cb component. Instead of using the reconstructed sample signal, the cross component prediction is applied in residual domain. This is implemented by adding a weighted reconstructed Cb residual to the original Cr intra prediction to form the final Cr prediction:

$$\text{pred}^*_{Cr}(i,j) = \text{pred}_{Cr}(i,j) + \gamma \cdot \text{resi}_{Cb}'(i,j) \quad (6)$$

The scaling factor $\gamma$ is derived in the same way as the derivation of parameters $\alpha$ and $\beta$ described above. The only difference is an addition of a regression cost relative to a default $\gamma$ value in the error function so that derived scaling factor is biased towards the default value (−0.5).

Intra Prediction Coding Overhead.

Figure 7A:
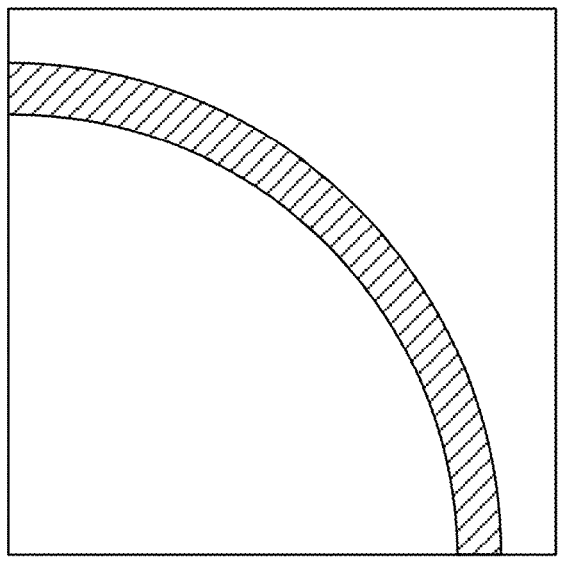
FIGS. 7A-7D are schematic illustrations comparing different intra mode partition methods.
Figure 7B:
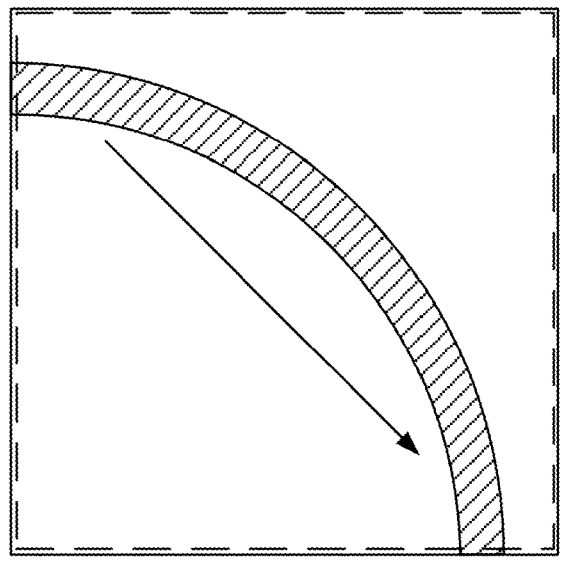
Figure 7C:
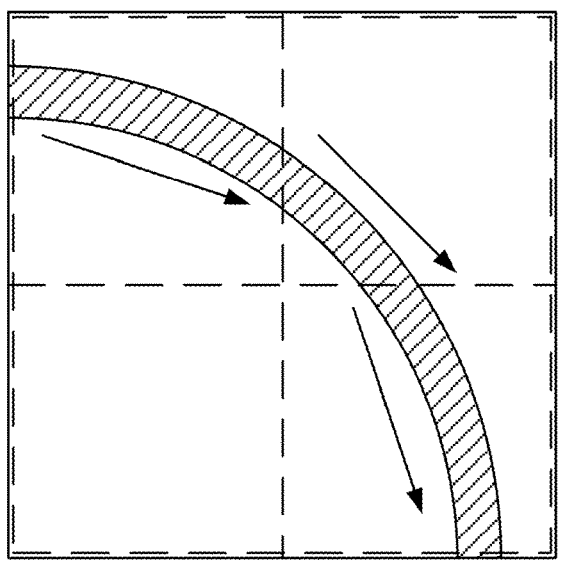
Figure 7D:
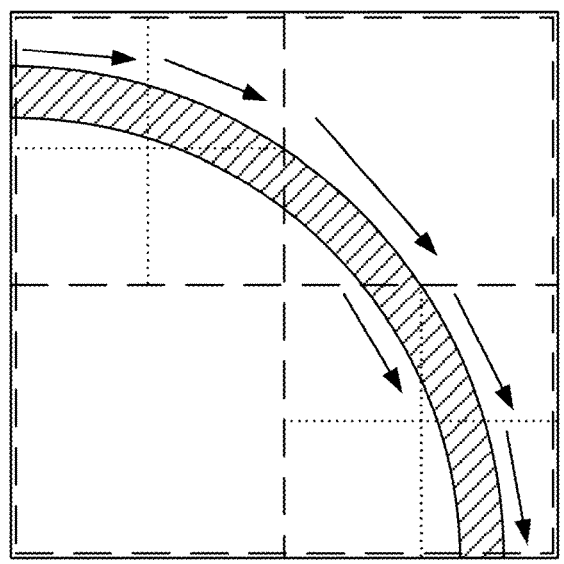

As discussed above, high coding efficiency can be achieved for the intra coding in HEVC and JEM by increasing the number of directions supported for the intra prediction. Additionally, CUs can be further split into multiple non-overlapped PUs, each of which can have a different intra prediction mode. This PU-based representation of intra prediction directions provides good coding efficiency especially for regions with different directional edges. However, in natural content, the edges of one object may be gradually changing along a certain range of directions, which does not always perfectly align with the shape of CU/PU partitions that are restricted to be squares. Therefore, a large amount of signaling overhead (e.g., the bits to indicate the depth of CU partition, the PU partition type and intra prediction directions) is expended on splitting the region into small CU/PUs, each with different intra prediction directions, in order for the predicted texture direction to be aligned with the actual edge direction of the object. To illustrate the abovementioned problem, FIGS. 7A-7D show a comparison of several partition methods for intra coding. In FIGS. 7A-7D, it is assumed that the current region is a 16×16 block which contains an arc-shape object of FIG. 7A (as enclosed in the patterned stripe) with boundary samples along a gradually changing edge from 0° (direct horizontal) to 90° (direct vertical). In FIG. 7B, the whole region is coded as one CU (as enclosed in dashed lines) by one single intra prediction direction; however, samples located on the edges in different directions within the block cannot be precisely predicted. FIG. 7C divides the whole region into four CUs (as enclosed in dashed lines) and each CU is predicted by its own direction; as a result, the number of precisely predicted samples is increased. FIG. 7D shows the partition structure where both CU (as enclosed in dashed lines) and PU (as enclosed in dotted lines) partitions are applied. This method further increases the intra prediction accuracy by assigning different intra prediction modes to each CU/PU. However, as mentioned earlier, the penalty of this method is a large number of bits need to be signaled to indicate partition structure and intra prediction directions in bit-stream.

Control-Point Based Intra Prediction.

Systems and methods are disclosed herein for intra coding based on a control-point representation of prediction directions. The proposed systems and methods may improve the efficiency of intra coding by increasing the precision of intra prediction directions without substantially increasing the overhead of signaling block partitions and intra prediction modes. In an exemplary method, the intra prediction direction of samples inside a video block is derived from a set of controlling intra prediction directions for the current block. Additionally, a flag may be signaled to indicate whether the control-point based intra prediction is enabled or not. In case control-point based intra prediction is enabled, the intra modes of the control-points for the current block may be transmitted to the decoder, and the intra modes of the samples inside the block are derived from the control-point intra directions. In cases where the texture of the samples in the current block changes direction, control-point based intra prediction can provide a good estimate of the intra prediction directions for the samples inside the block. Systems and methods of control-point based intra prediction can make the use of relatively large intra coding units (CUs) and prediction units (PUs), therefore reducing the overhead used for signaling CU/PU partitions and intra direction information.

As discussed above, for PU-based intra direction signaling, the adaptation of intra directions is restricted by the square shapes of PU partitions. Since the local object edge(s) may gradually change directions within a block, in order to align the intra prediction direction with the local object edge(s), a large amount of overhead is usually needed in order to split the current block into small PUs. To address this issue, a new control-point based representation method of intra prediction directions is described herein. Exemplary embodiments can improve the intra coding efficiency by increasing the precision of intra prediction directions without significantly increasing the overhead of signaling block partitions and intra prediction directions. Specifically, in exemplary embodiments, intra prediction directions at one or more control points are signaled for a given video block. Then, by exploiting the spatial correlation between adjacent samples (or blocks), the intra prediction direction of each sample (or a sub-block of samples) within the current block is derived from the intra prediction directions of the control points.

Given that the intra directions of samples in the current block are directly derived from those at the control points, the proposed systems and methods have relatively small signaling overhead of intra directions, as only one or more intra directions per block need to be signaled. Additionally, as the proposed representation method allows derivation of intra prediction directions at finer granularity level (e.g., sample level and various sub-block levels), there is less of a need to split the current region into small CU/PUs. This could lead to an increased usage of large intra CU/PUs, therefore reduce the overhead used for signaling CU/PU partitions. Both of those two aspects can result in improved coding performance of video blocks that are coded using control-point intra prediction.

Hybrid Video Coding with a Control-Point Based Intra Prediction Mode.

As described above, exemplary control-point based intra prediction systems and methods may reduce the signaling overhead of block partitions (e.g., CU, PU and TU partitions) and intra prediction directions. If the control-point based intra prediction model can provide a good estimate of local intra directions within a region, there is no need to split the region into small CU/PU partitions in order to align block boundaries with the variation of local edges; also, the intra prediction directions inside the region can be derived from those directions at control-points, instead of being explicitly signaled. Therefore, compression gain is achieved. However, the proposed control-point based intra prediction model may not be always accurate enough and may impair the intra prediction efficiency due to large prediction errors. Therefore, to further improve the coding performance, the proposed method is proposed to be adaptively selected at certain block level. In some embodiments, a flag is signaled in the bitstream to transmit the encoder decision to the decoder, indicating that the current block is predicted using either a control-point intra prediction mode or the existing intra prediction mode. For example, the encoder may use Rate-Distortion (R-D) optimization decision in a way similar to the Lagrangian optimization method used in HM and JEM to determine whether to use the control-point intra prediction to predict a current block.

Figure 8:
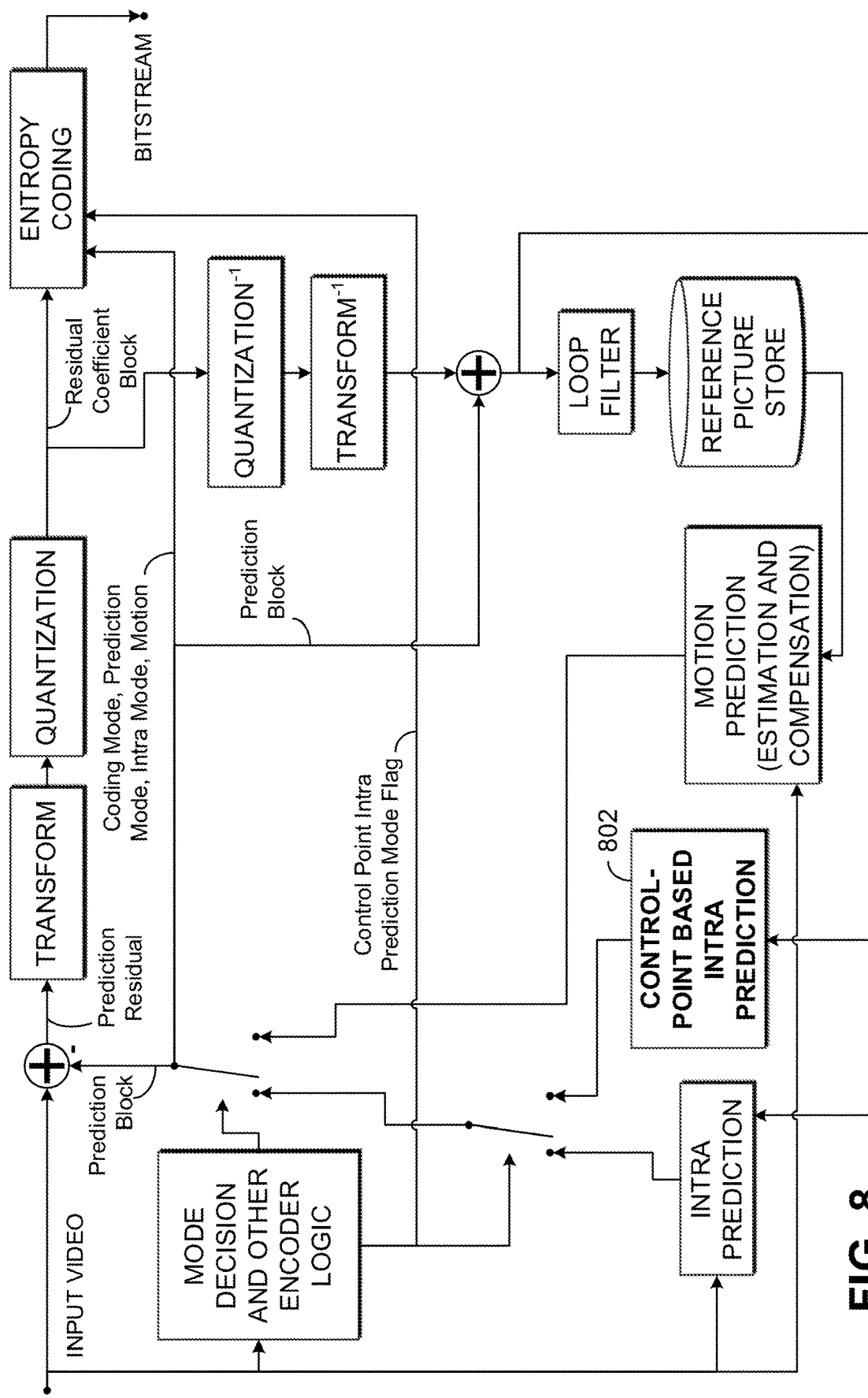
FIG. 8 is a block diagram of a hybrid video encoder with the inclusion of a control-point based intra prediction module.

FIG. 8 is a functional block diagram of an exemplary hybrid video encoder configured to implement a control-point based intra prediction mode. For intra-coded blocks, the encoder estimates the intra prediction mode by selecting from conventional intra prediction modes and the proposed method, for example, using R-D optimization. Similar to the existing video encoder (as shown in FIG. 1), the intra prediction module generates the intra prediction signal by predicting the samples of the block from its adjacent reconstructed samples belonging to neighboring block. The original signal is subtracted by the intra prediction signal to remove spatial redundancy and produce the corresponding residual signal. The transform and quantization are applied to the residual signal which are then entropy-coded and output to bit-stream. To obtain the reconstructed signal, the reconstructed residual signal is inverse quantized followed by inverse transform. The reconstructed residual is added to the prediction signal. Further, in-loop filtering processes, e.g., de-blocking, SAO and ALF, are applied to the reconstructed video signal for output. As mentioned above, to improve the coding gain, a control point intra mode prediction flag (e.g. control_point_intra_prediction_mode_flag) may be signaled at a given block level (e.g., CU, PU or TU level) to indicate whether the proposed control-point based intra prediction is applied to the current block. If it is applied to the current block, a control-point based intra prediction module 802 performs intra prediction using techniques described herein.

Figure 9:
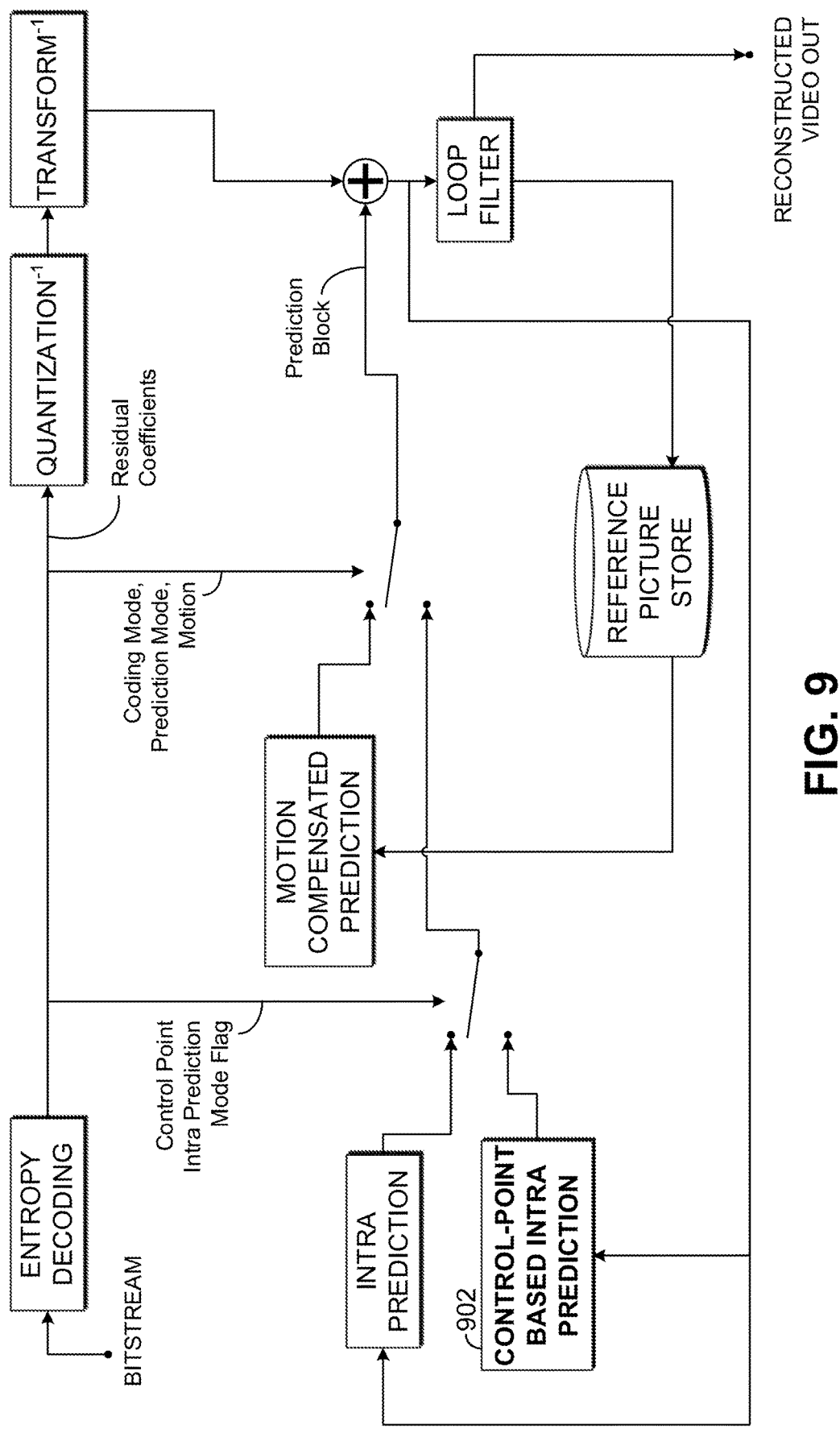
FIG. 9 is a block diagram of a hybrid video decoder with the inclusion of a control-point based intra prediction module.

FIG. 9 is a functional block diagram of a hybrid video decoder configured to implement a control-point based intra prediction mode. The decoder of FIG. 9 may be configured to receive the bit-stream produced by the encoder in FIG. 8. At the decoder, the bit-stream is parsed by the entropy decoder. The residual coefficients are inverse quantized and inverse transformed to obtain the reconstructed residual. The coding mode and prediction information are used to obtain the prediction signal using either spatial prediction or temporal prediction. For intra-coded blocks, if the control point intra mode prediction flag (e.g. control_point_intra_prediction_mode_flag) is true, the prediction signal is generated by the proposed control-point based intra prediction method using a control-point based intra prediction module 902; otherwise, the prediction signal is generated by a conventional intra prediction process. The prediction signal and the reconstructed residual are added together to get the reconstructed video. The reconstructed video may additionally go through loop filtering before being stored in the reference picture store to be displayed and/or to be used to decode future video signal.

Several features of various control-point based intra prediction encoding and decoding methods proposed herein are described in greater detail below.

Direction Representation of a Control-Point Based Intra Prediction Mode.

Figure 10:
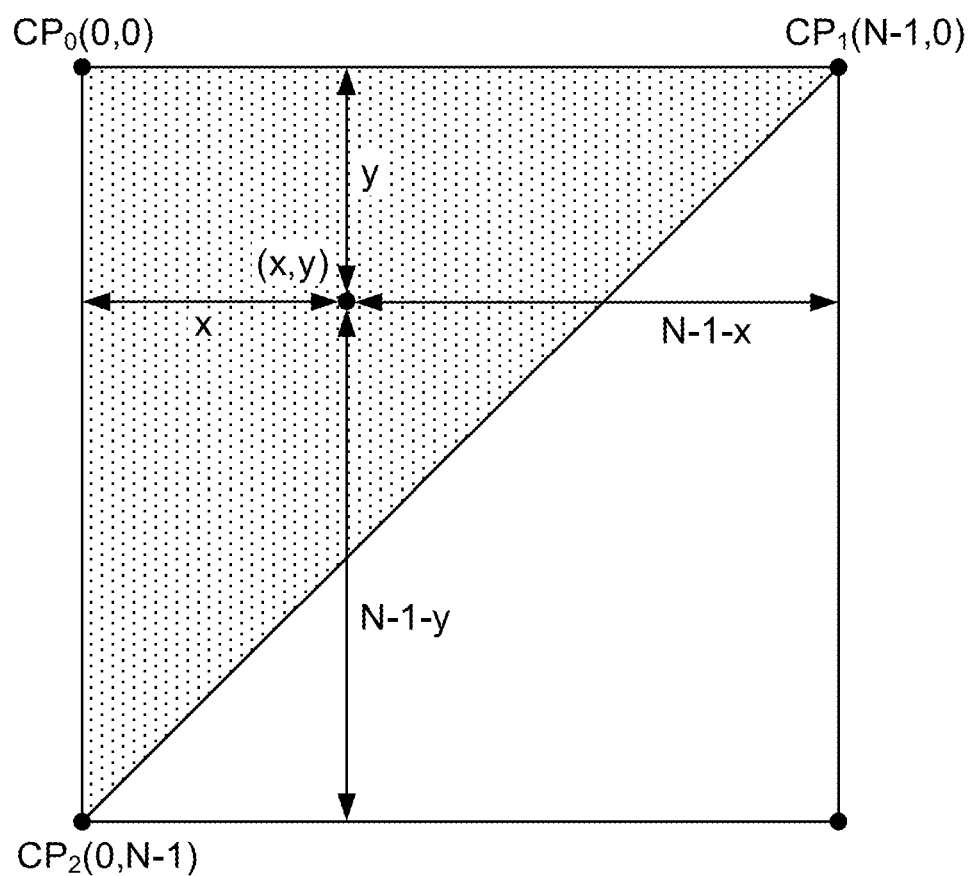
FIG. 10 is a schematic illustration of an exemplary control-point representation of intra prediction directions.

In an exemplary coding process, consider a current CU, which is an N×N block, and set the coordinate system as shown in FIG. 10. The top-left, top-right and bottom-left corners, (0, 0), (N−1, 0) and (0,N−1), serve as three control points, denoted as $CP_0$, $CP_1$ and $CP_2$, respectively. The target sample, which is located at position (x,y), specifies the current sample for which it is desired to estimate the intra prediction direction. Let $IM(CP_i)$ and $IM(x,y)$ be the intra prediction direction of the i-th controlling point $CP_i$, i=0, 1, 2, and the intra prediction direction of the target sample to be estimated. Then the proposed control-point based intra direction derivation method in the present embodiment is described as $$IM(x, y) = \sum_{i=0}^{K-1} \phi_i(x, y) IM(CP_i) \qquad (7)$$

where $\phi_i(x,y)$ is an interpolation kernel function which specifies the contribution of the i-th controlling intra direction to the resulting intra direction of the target sample, and K is the number of control points used in the direction interpolation process (K is equal to 3 in the example shown by FIG. 10). Different interpolation kernel functions, e.g., triangular interpolation, bilinear interpolation, Gaussian, spline interpolation and so forth, may be applied in exemplary embodiments. It should be noted that the term "interpolation" as used herein further encompasses extrapolation in that interpolation is not limited herein to points that fall strictly within geometric bounds of the control points.

In an exemplary embodiment in which triangular interpolation is used, the interpolation kernel functions associated with the three controlling points in (7) may be given as $$\phi_0(x,y)=(N-1-x-y)/(N-1)$$

$$\phi_1(x,y)=x/(N-1)$$

$$\phi_2(x,y)=y/(N-1) \quad (8)$$

If the target point is located in the triangle formed by $CP_1$, $CP_0$ and $CP_2$ (the samples within the shadow region in FIG. 10), the triangular interpolation result will be within the range restricted by control points. If the target point is outside the triangle (samples in the blank region in FIG. 10), the triangular interpolation result may be clipped into a valid range because it is extrapolated and possibly outside the range restricted by control points.

In another example, bilinear interpolation is used. In this case, the interpolation kernel functions of three controlling points may be given as $$\phi_0(x,y)=(N-1-x)(N-1-y)/(N-1)^2$$

$$\phi_1(x,y)=(x(N-1-y)+x(N-1))/(2(N-1)^2)$$

$$\phi_2(x,y)=(y(N-1-x)+y(N-1))/(2(N-1)^2) \quad (9)$$

As shown in Equations (7)-(9), the interpolation processes of the proposed control-point based intra direction derivation method may involve division by (N−1) or (N−1)². Given that video block size N is usually a power of 2, division by (N−1) or (N−1)² usually cannot be implemented as bit-shift operations and thus requires undesirable computational complexity. In some embodiments, to perform division more efficiently, fixed point approximation may be used to calculate the result. Without loss of generality, consider division by (N−1) as an example. This division may be approximated by two integer values M and B, as indicated as $$\frac{1}{N-1} \approx \frac{M}{2^B}$$

Thus, in some embodiments, the division may be implemented as a multiplication by M followed by a bit-shift of B to the right.

Alternatively, in some embodiments, to promote efficient division, the control-point locations may be slightly overlapped between neighboring blocks. Specifically, using the coordinate system as defined in FIG. 10, the location of the top-left control-point ($CP_0$,) is unchanged, at (0, 0). However, the locations of the top-right, bottom-left control-points ($CP_1$ and $CP_2$) are moved to cross the block boundary by one additional column and one additional row respectively, such that the new locations $CP_1$ and $CP_2$ will become (N,0) and (0,N) which belong, respectively, to the neighboring blocks to the right of and below the current block. Correspondingly, the value of (N−1) in equations (7)-(9) becomes N after this adjustment. Thus, where N is a power of 2, the divisions in equations (7)-(9) may be implemented using bit shifts.

In yet another embodiment, the control-points $CP_1$ and $CP_2$ are obtained from the top-right and bottom-left corners of the current block, namely from the locations of (N−1, 0) and (0, N−1) respectively, while the control-point $CP_0$ is obtained from the top-left neighboring sample of the current block, namely the location (−1, 1). This way, the denominators in equations (7)-(9) also become N and the divisions can be implemented using bit shifts where N is a power of 2.

Selection of Control Points.

Figure 11A:
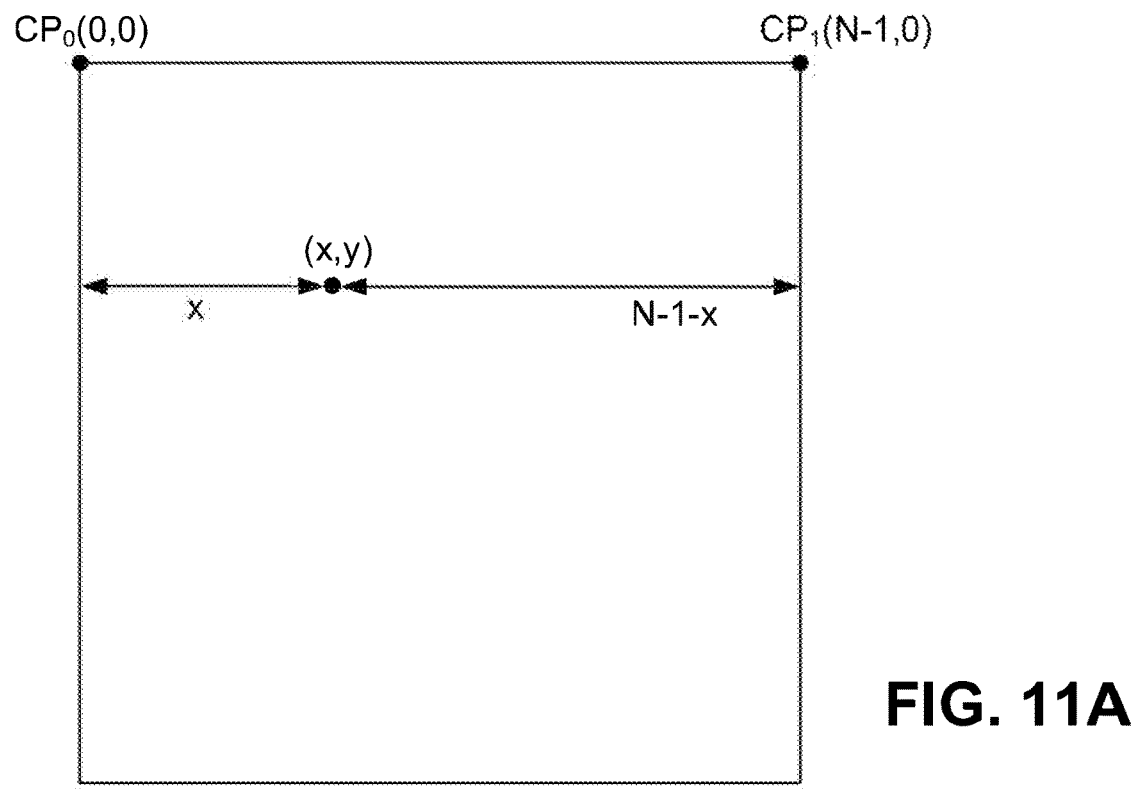
FIGS. 11A-11D are schematic illustration of selections of control points in embodiments in which two controlling intra prediction directions are applied.

In video coding, the coding of the intra direction can take a significant amount of bits and therefore impact the overall coding performance, especially at low bit-rate. The resulting overhead of signaling control intra directions could neutralize the advantages of the proposed control-point representation. In different embodiments, different number of control-points with various locations can be selected, which may result in different coding performance of video content. Using more control points is advantageous in the sense that it can yield a more accurate estimation of varying intra prediction directions inside one video block. However, a larger number of control points also leads to an increased overhead given that more controlling intra directions need to be sent. On the other hand, a smaller number of control-points can reduce signaling overhead while not always being able to provide an accurate intra prediction estimation. Therefore, exemplary embodiments allow a different number of control-points to be selected for different video content, with the number of control points being large enough for accurate estimation of intra prediction directions inside the block while leading to an appropriate signaling overhead. In one embodiment, the top-left and top-right corners of the current video block are used as the control-points for the proposed intra prediction derivation method (as shown in FIG. 11A). In a case where bilinear interpolation is applied, the interpolation kernel functions of control-points (as shown in Equation (9)) can be represented as $$\phi_0(x,y)=(N-1-x)/(N-1)$$

$$\phi_1(x,y)=x/(N-1) \quad (10)$$

Figure 11B:
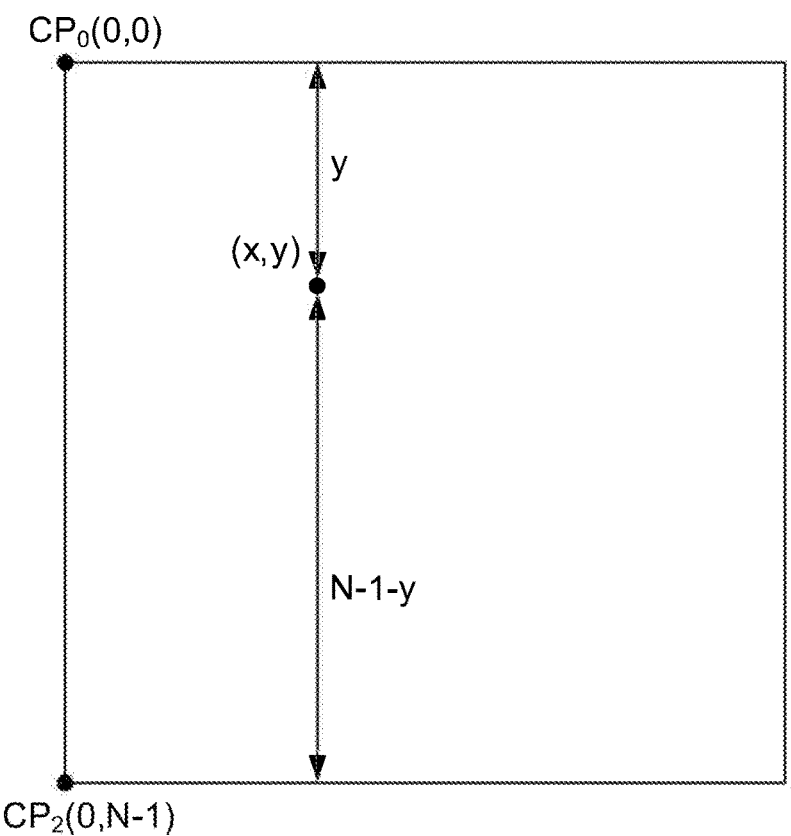

Given that two control-points are obtained horizontally, this control-point selection is more efficient for estimating intra directions of video blocks that have dominant edges in the horizontal direction. In another embodiment, the top-left and bottom-left corners of the current video block are used as the control-points for the proposed intra prediction derivation method (as shown in FIG. 11B). Assuming the bilinear interpolation is applied, the interpolation kernel functions of control-points (as shown in Eq. (9)) can be represented as $$\phi_0(x,y)=(N-1-y)/(N-1)$$

$$\phi_2(x,y)=y/(N-1) \quad (11)$$

Because the two control-points are obtained vertically, this control-point selection is efficient for estimating intra directions of video blocks that have dominant edges in a vertical direction.

Figure 11C:
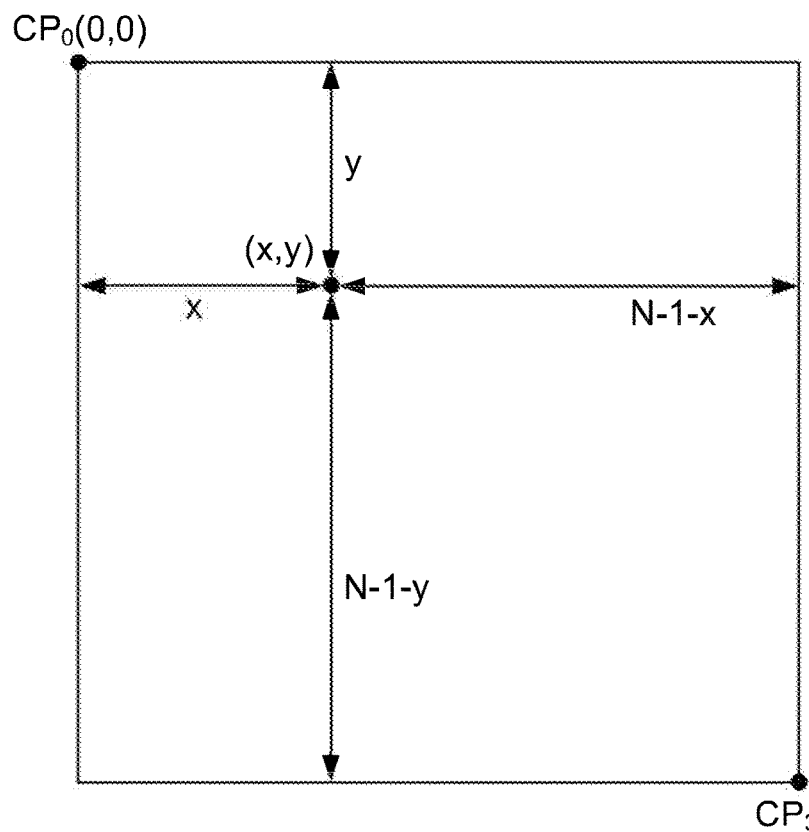

In embodiments in which the top-left and bottom-right corners of the current video block are used as control-points (as shown in FIG. 11C), the interpolation kernel function may be represented as the following:

$$\phi_0(x,y)=(N-1(x+y)/2)/(N-1)$$

$$\phi_3(x,y)=((x+y)/2)/(N-1) \quad (12)$$

Figure 11D:
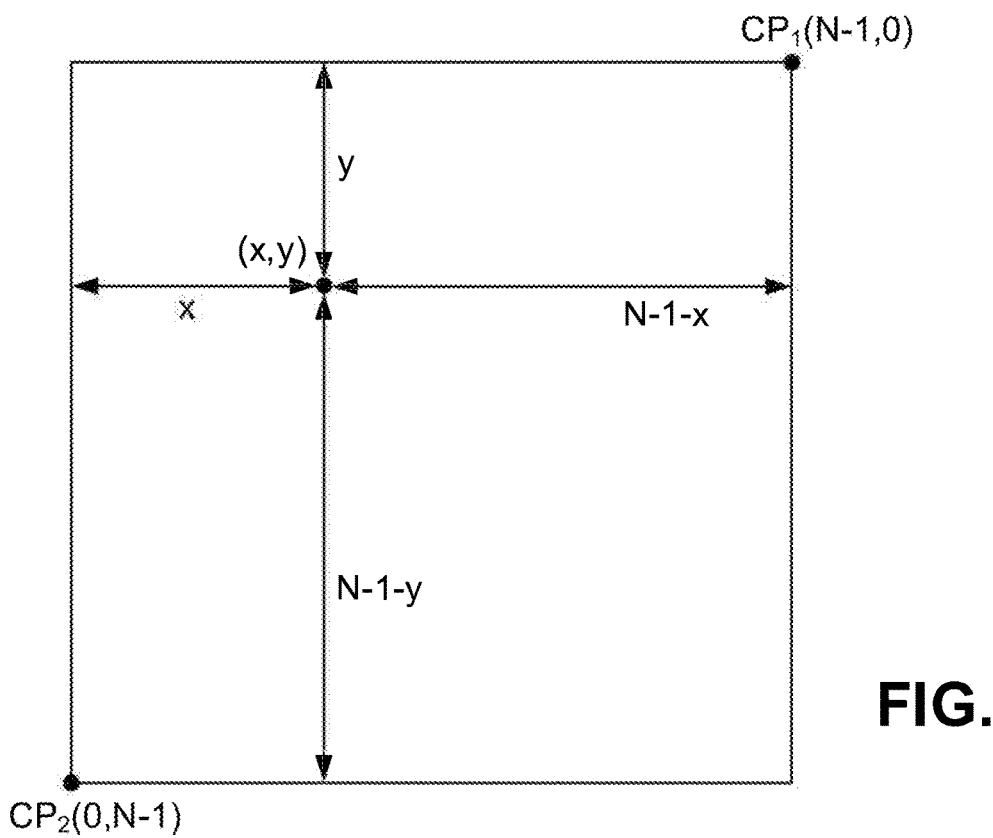

If top-right and bottom-left corners of the current video block are used as control-points (as shown in FIG. 11D), the interpolation kernel function may be represented as the following:

$$\phi_1(x,y)=((N-1+x-y)/2)/(N-1)$$

$$\phi_2(x,y)=((N-1-x+y)/2)/(N-1) \quad (13)$$

The proposed control-point based intra prediction derivation methods may use various numbers of control points for the coding based on the content's characteristics, such as three control points or two control points. In some embodiments, the control-point configuration is signaled at the picture level or the slice level. For example, the identification of a control point within the block can be defined as in Table 3, where block_width and block_height are the width and height of the block that control-point is applied to. An exemplary control-point table is defined in Table 4, which specifies the number of control-points and the position of each control point. At the picture level (e.g. in the picture parameter set) or sequence level (e.g. in the sequence parameter set), multiple control-point tables defined in Table 4 may be signaled, and they may be differentiated by the "control_points_model_id". The "control_points_model_id" may also be signaled at the slice level or coding block level (e.g. CTU, CU).

TABLE 3

Index of control point.

| CP_Id | Position |
|---|---|
| 0 | top-left: (0, 0) |
| 1 | top-right: (block width-1, 0) |
| 2 | bottom-left: (0, block height-1) |
| 3 | bottom-right: (block with-1, block height-1) |
| 4 | customized: (x, y) to be signaled explicitly |

TABLE 4

Signaling of control-points

| | Descriptor |
|---|---|
| control_points_table ( ) { | |
|   control_points_model_id | ue(v) |
|   num_control_points | ue(v) |
|   for (int i=0; i< num_control_points; i++) { | |
|     CP_Id | ue(v) |
|     if (cp_id == 4) { | |
|       pos_x | u(8) |
|       pos_y | u(8) |
|     } | |
|   } | |
| } | | control_points_model_id: indicates the ID of control_point model signaled in the table.
num_control_points: specifies the number of control points for this model.
CP_Id: specifies the ID defined in Table 3 of the control point.
pos_x: specifies horizontal position of control point with ID being equal to 4. The actual position is calculated as (pos_x*block_width + 128)/256. block_width is the width of the block.
pos_y: specifies vertical position of control point with ID being equal to 4. The actual position within the block is calculated as (pos_x*block_height + 128)/256. block_height is the height of the block.

It should be noted that with respect to Equations (10)-(13), techniques as described above for efficient division by (N−1) may also be applied.

As shown in FIGS. 11A and 11B, selecting different control-points may be beneficial to video regions presenting different directional characteristics. Taking this aspect into consideration, region-based control-point adaptation may be applied. Specifically, in an exemplary method, the horizontal control-point selection (as shown in FIG. 11A) is enabled for regions that have dominant horizontal edge information, and the vertical control-point selection (as shown in FIG. 11B) is enabled for regions that have dominant vertical edge information. For non-flat regions whose edges are neither horizontal nor vertical, the three control-points (as shown in FIG. 10) may be selected. The dominant edge direction in one region can be determined from the reconstructed neighboring samples of the current video block. In one embodiment, the Sobel operator is used to calculate the horizontal and vertical derivatives of neighboring reconstructed samples.

$$G_x = \begin{bmatrix} -1 & 0 & 1 \\ -2 & 0 & 2 \\ -1 & 0 & 1 \end{bmatrix}, G_y = \begin{bmatrix} -1 & -2 & -1 \\ 0 & 0 & 0 \\ 1 & 2 & 1 \end{bmatrix} \quad (14)$$

If the ratio between $G_y$ and $G_x$ is larger than a predefined threshold ($T_1$), then the region may be classified as horizontal edge region; if the ratio between $G_y$ and $G_x$ is smaller than another predefined threshold ($T_2$, $T_2 \ll T_1$), then region may be classified as vertical edge region; otherwise, the edge of the region may be regarded as neither horizontal nor vertical.

In another embodiment, the likely direction of the texture inside the current block may be derived from the set of MPMs. For example, if majority modes in the MPM set indicate a horizontal direction, then the two horizontal control points in FIG. 11A may be used. If majority modes in the MPM set indicate vertical direction, then the two vertical control points in FIG. 11B may be used. If there is not strong indication of horizontal or vertical from the MPM modes, then the three control points in FIG. 10 may be used.

Granularity of Deriving Intra Prediction Direction Based on Control Points.

Figure 12A:
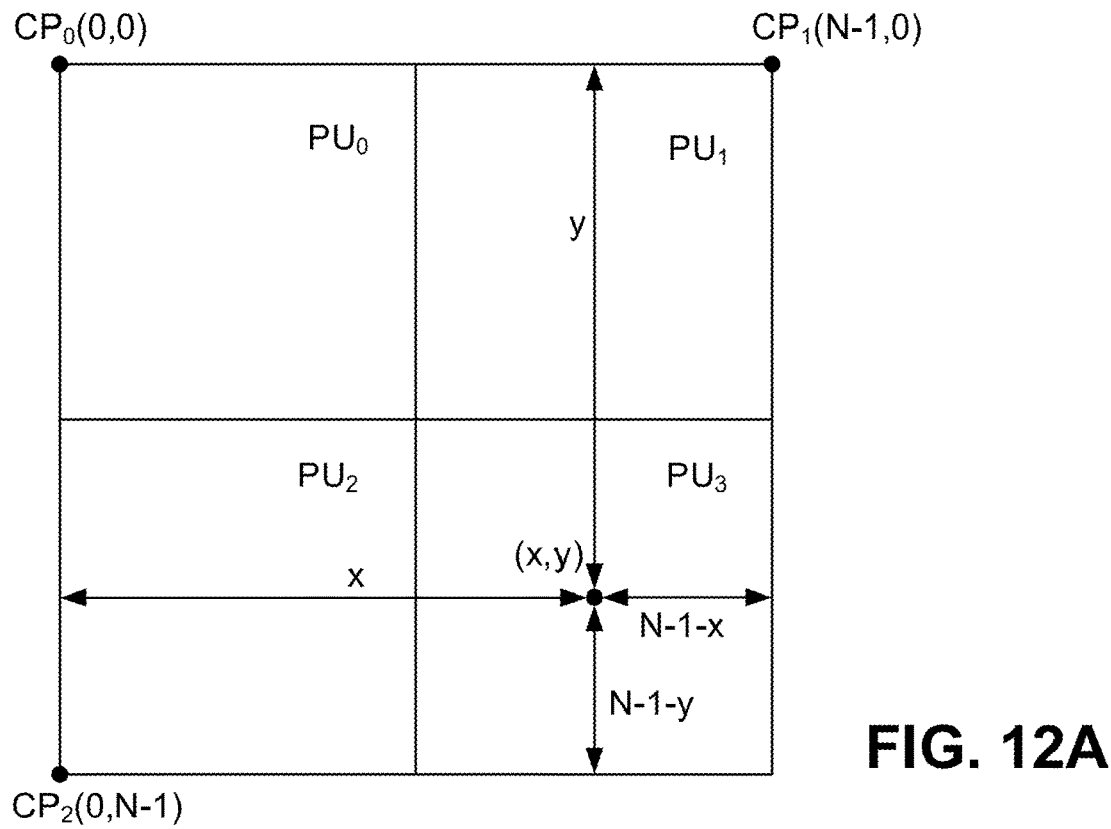
FIGS. 12A and 12B are schematic illustrations of derivation of intra prediction directions in embodiments in which three control-points are applied.
Figure 12B:
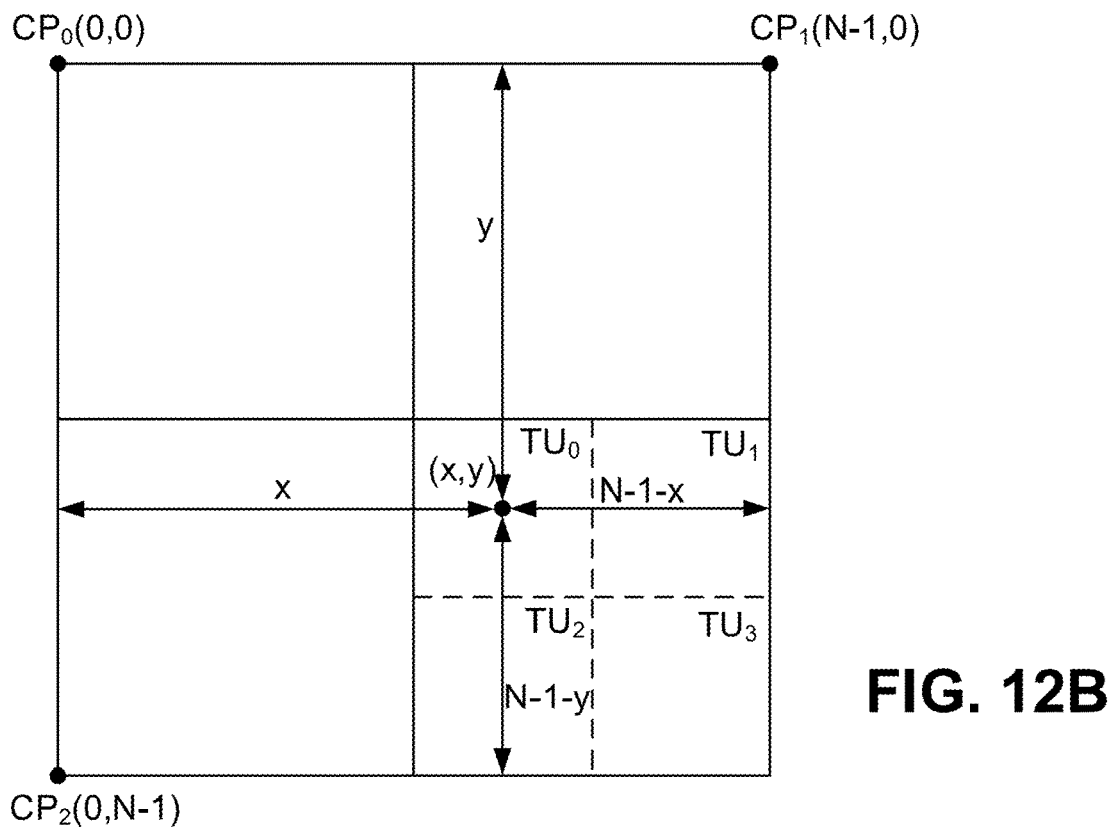

In the embodiments of FIG. 10 and FIGS. 11A-11D, the intra prediction directions are derived based on sample unit (such that each sample inside the video block may have its own intra direction); however, intra direction derivation methods in accordance with the present disclosure can be conducted at various levels, such as CU-, PU- and TU-level, and each adaptation level may provide different intra direction adaptation capability and encoding/decoding complexity. For example, if the intra prediction direction is derived at the TU level, the encoder/decoder derives the intra prediction mode for each TU and the samples within one TU will use the same derived intra direction. If the intra prediction direction is derived at the PU, the encoder or decoder may only need to derive intra directions for each PU, and all the TUs inside that the PU will use the same derived intra direction for their own intra prediction. In a case where three control-points are used, FIGS. 12A-12B show the cases of deriving intra prediction directions at the PU-level (FIG. 12A) and at the TU-level (FIG. 12B) for the proposed control-point based intra prediction method, where solid and dashed lines depict the boundaries of PUs and TUs respectively. In FIG. 12A the target block is prediction unit $PU_3$, and in FIG. 12B the target block is transform unit $TU_0$. As an exemplary embodiment, in FIGS. 12A-12B, the center position of the target block is used as the representative coordinate to derive the intra direction for the block. In other embodiments, other positions may be selected as the representative coordinate.

The level at which control-point based intra prediction is enabled/disabled (e.g. the level at which the flag control_point_intra_prediction_mode_flag is signaled, or the level at which control-points are defined) is in many embodiments higher than the level of intra direction derivation. For example, the control-point based intra prediction may be enabled at the CU level while the corresponding intra prediction derivation may be performed at PU-level, TU level or sample level. If the intra direction derivation is carried over at the same level of defining control-points (e.g., both at CU-level), then the proposed method degenerates to the normal intra mode because only one single control-point is needed, which is actually the signaled intra prediction mode of the block.

Predicting and Signaling Control-Point Intra Directions.

The signaling overhead of the control-point's intra directions affects the overall performance of the proposed control-point based intra prediction mode. To reduce the signaling overhead, in one embodiment of the disclosure, it is proposed to directly reuse the existing intra mode signaling methods in HM and JEM for signaling control-point intra directions. Specifically, for each control point, a set of MPM candidates are generated from DC, planar and intra modes of its left and top neighbors. In case the control intra direction is identical to one of the MPM candidates, only the index corresponding to the candidate is sent; otherwise, the control intra direction is signaled using a fixed length code. In another embodiment, the MPM candidate list may be constructed by only including angular directions when control-point based intra prediction mode is enabled because non-angular intra directions (DC and planar) are not used in control-point intra prediction.

Differential coding is widely employed to reduce the signaling overhead of various syntax elements in modern video codec. For example, in HM and JEM, differential coding is used for efficient motion vector (MV) coding where one MV is predicted from one of its spatial and temporal neighbors and only the residue needs to be transmitted. Given the strong correlation with intra prediction directions of neighboring video blocks, for one video block, the control-point's intra prediction directions may be very similar. Therefore, in one embodiment of the disclosure, it is proposed to use differential coding for signaling control-point intra directions. More specifically, one of the control-points (e.g., $CP_0$ in FIGS. 10 and 11) is firstly signaled based on the existing MPM-based intra mode prediction method. Then, the intra direction of this control-point is used to predict the intra directions of the other control-points (e.g., $CP_1$ and $CP_2$ in FIGS. 10 and 11). Correspondingly, only the difference between the modes is signaled.

High-Accuracy Intra Prediction for Control-Point Based Intra Prediction Mode.

In JEM, the number of the angular intra modes is 65. The number of 65 is selected in order to provide an increased intra prediction granularity without overwhelmingly increasing the signaling overhead of intra prediction mode which may neutralize the coding gain obtained from the increased intra prediction accuracy. In embodiments disclosed herein, the intra directions of samples inside the current block are derived from control-points, and no overhead needs to be signaled for those derived intra directions inside the current block (e.g., using Equation (7)) in the bit-stream. Therefore, when a control-point based intra prediction mode is enabled, the number of directional intra prediction modes of those samples inside the block can be increased with no signaling cost. In order to more accurately capture the edge directions in natural videos, in one embodiment of the disclosure, it is proposed to increase the number of angular intra prediction modes with a finer granularity direction indication when the control-point based intra prediction mode is enabled.

In HEVC, bilinear interpolation is applied to obtain intra predictions when the target samples are predicted from one reference sample at a fractional position. Specifically, each predicted sample P(x,y) at location (x,y) is obtained by projecting its location onto a reference row of pixels based on the selected prediction direction and interpolating a value for the predicted sample at 1/32 sample accuracy, where bilinear interpolation is performed utilizing the two closest reference samples, $R_i$ and $R_{i+1}$, at integer positions.

$$p(x,y)=((32-w_y) \cdot R_i + w_y \cdot R_{i+1} + 16) >> 5 \quad (15)$$

where $w_y$ is the weighting parameter between two integer reference samples $R_i$ and $R_{i+1}$ which specifies the segment covering the projected fractional location and >> denotes right bit-shift operation. The reference sample index i and $w_y$ are calculated based on the projection displacement d corresponding to the selected intra prediction mode (which describes the tangent of the intra prediction direction in the precision of 1/32 sample) as $$c_y=(y \cdot d) >> 5$$

$$w_y=(y \cdot d) \& 31$$

$$i=x+c_y \quad (16)$$

where "&" denotes bitwise AND operation. Table 5 specifies exemplary values of the projection displacement d for different intra prediction directions.

TABLE 5

Mapping between intra prediction direction and projection displacement d for the 33 angular intra prediction directions in HEVC.

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| d | — | 32 | 26 | 21 | 17 | 13 | 9 | 5 | 2 | 0 | −2 | −5 | −9 | −13 | −17 | −21 | −26 |
| predModeIntra | 18 | 19 | 20 | 21 | 22 | 23 | 24 | 25 | 26 | 27 | 28 | 29 | 30 | 31 | 32 | 33 | 34 |
| d | −32 | −26 | −21 | −17 | −13 | −9 | −5 | −2 | 0 | 2 | 5 | 9 | 13 | 17 | 21 | 26 | 32 |

As discussed above, when a control-point intra prediction mode is selected, the number of supported angular intra prediction directions may be increased. Correspondingly, the existing 1/32 sample accuracy may be insufficient to represent all possible directional intra predictions in the finer granularity. Therefore, in one embodiment of the disclosure, it is proposed to increase the accuracy of the intra interpolation filtering when the proposed control-point based intra prediction is enabled for the current video block. Denoting $2^B$ as the number of defined fractional samples for the finer granularity intra prediction, the bilinear filtering process (of Equation (15)) and the reference sample index derivation (of Equation (16)) may be expressed as $$p(x,y)=((2^B-w_y) \cdot R_i + w_y R_{i+1} + 2^{B-1}) >> B \quad (17)$$

$$c_y=(y \cdot d) >> B$$

$$w_y=(y \cdot d) \& 2^B$$

$$i=x+c_y \quad (18)$$

Additionally, the dynamic range of the projection displacement d may also be enlarged in order to represent the tangent values of the increased intra prediction granularity.

In an embodiment in which the number of intra prediction directions is 131 (including planar, DC and 129 angular intra directions) with the accuracy of intra interpolation being 1/64 sample, Table 6 shows exemplary projection displacement values d associated with the 129 angular intra prediction directions.

TABLE 6

Mapping between intra prediction direction and projection displacement d for 129 angular intra prediction directions.

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| d | — | 64 | 61 | 58 | 55 | 52 | 49 | 46 | 44 | 42 | 40 | 38 | 36 | 34 | 32 | 30 | 28 |
| predModeIntra | 18 | 19 | 20 | 21 | 22 | 23 | 24 | 25 | 26 | 27 | 28 | 29 | 30 | 31 | 32 | 33 | 34 |
| d | 26 | 24 | 22 | 20 | 18 | 16 | 14 | 12 | 10 | 8 | 6 | 5 | 4 | 3 | 2 | 1 | 0 |
| predModeIntra | 35 | 36 | 37 | 38 | 39 | 40 | 41 | 42 | 43 | 44 | 45 | 46 | 47 | 48 | 49 | 50 | 51 |
| d | −1 | −2 | −3 | −4 | −5 | −6 | −8 | −10 | −12 | −14 | −16 | −18 | −20 | −22 | −24 | −26 | −28 |
| predModeIntra | 52 | 53 | 54 | 55 | 56 | 57 | 58 | 59 | 60 | 61 | 62 | 63 | 64 | 65 | 66 | 67 | 68 |
| d | −30 | −32 | −34 | −36 | −38 | −40 | −42 | −44 | −46 | −49 | −52 | −55 | −58 | −61 | −64 | −61 | −58 |
| predModeIntra | 69 | 70 | 71 | 72 | 73 | 74 | 75 | 76 | 77 | 78 | 79 | 80 | 81 | 82 | 83 | 84 | 85 |
| d | −55 | −52 | −49 | −46 | −44 | −42 | −40 | −38 | −36 | −34 | −32 | −30 | −28 | −26 | −24 | −22 | −20 |
| predModeIntra | 86 | 87 | 88 | 89 | 90 | 91 | 92 | 93 | 94 | 95 | 96 | 97 | 98 | 99 | 100 | 101 | 102 |
| d | −18 | −16 | −14 | −12 | −10 | −8 | −6 | −5 | −4 | −3 | −2 | −1 | 0 | 1 | 2 | 3 | 4 |
| predModeIntra | 103 | 104 | 105 | 106 | 107 | 108 | 109 | 110 | 111 | 112 | 113 | 114 | 115 | 116 | 117 | 118 | 119 |
| d | 5 | 6 | 8 | 10 | 12 | 14 | 16 | 18 | 20 | 22 | 24 | 26 | 28 | 30 | 32 | 34 | 36 |
| predModeIntra | 120 | 121 | 122 | 123 | 124 | 125 | 126 | 127 | 128 | 129 | 130 | | | | | | |
| d | 38 | 40 | 42 | 44 | 46 | 49 | 52 | 55 | 58 | 61 | 64 | | | | | | |

In another embodiment, a control-point based intra prediction method with increased angular direction granularity may be used in combination with other interpolation methods. Denoting $f_{w_y}(k)$ as the coefficients of the applied interpolation filter, $k=-(L/2-1), \ldots, 0, 1, \ldots L/2$, where L is the interpolation filter length, the value of the predicted sample P(x,y) at location (x,y) may be calculated as $$p(x, y) = \left( \sum_{k=-(L/2-1)}^{L/2} f_{w_y}(k) R_{i+k} + 2^{H-1} \right) \gg H \quad (19)$$

$$c_y = (y \cdot d) \gg B \quad (20)$$
$$w_y = (y \cdot d) \,\&\, 2^B$$
$$i = x + c_y$$

where H is the number of bits for representing filter coefficients. As shown in Equation (19), the filter coefficients $f_{w_y}(k)$ is dependent on the corresponding phase (i.e., $w_y$, $w_y=0, 1, \ldots, 2^B-1$) of the interpolated fractional sample in-between the corresponding integer samples.

When one intra block is coded in control-point based intra prediction mode, the derived intra prediction direction may be used as one of MPM candidates to predict the intra prediction modes of neighboring intra blocks. Correspondingly, the high-accuracy intra prediction directions of the control-point coded blocks may be rounded to the intra prediction accuracy of normal intra mode in order to ensure the predicted intra prediction direction and the MPM candidate having the same precision. Therefore, in one embodiment of the disclosure, when finer granularity intra prediction is enabled (e.g. 129 angular directions) for control-point coded blocks, it is proposed to round the high-accuracy intra prediction mode of the current block to the nearest intra prediction mode in the coarse granularity (e.g. 65 angular directions in JEM and 33 in HM) before it is stored and used as MPM candidate for predicting the intra prediction mode of its neighboring intra blocks. In a case where two neighboring coarse-accuracy intra directions have equal distance to the high-accuracy intra direction, a fixed rule (e.g., always rounding to the coarse-accuracy intra direction with smaller intra direction index, or always rounding to the coarse-accuracy intra direction which is closer to 45 degrees) may be applied.

In some embodiments, signaled intra prediction directions at the control points of the current block are used to predict the intra directions of adjacent blocks for which the intra directions are explicitly signaled. Therefore, to reduce the overhead of signaling intra mode, it is proposed to use the intra direction of the top-right control-point ($CP_1$ in in FIG. 10) as one candidate to generate the MPM list of the neighboring block to the right of the current block; similarly, it is also proposed to use the intra direction of the bottom-left control-point ($CP_2$ of FIG. 10) as one candidate to generate the MPM list of the neighboring block below the current block. Additionally, in one embodiment of the disclosure, it is proposed to add the intra direction of the control-point as one additional MPM candidate and increase the size of the MPM list by one. In another embodiment, to not increase the signaling overhead of MPM index, it is proposed to use the intra direction of the control-point to replace one of the existing MPM candidates (e.g., the last candidate in the MPM list) such that the size of the MPM list is kept unchanged.

Decoder-Side Control-Point Derivation.

Figure 13:
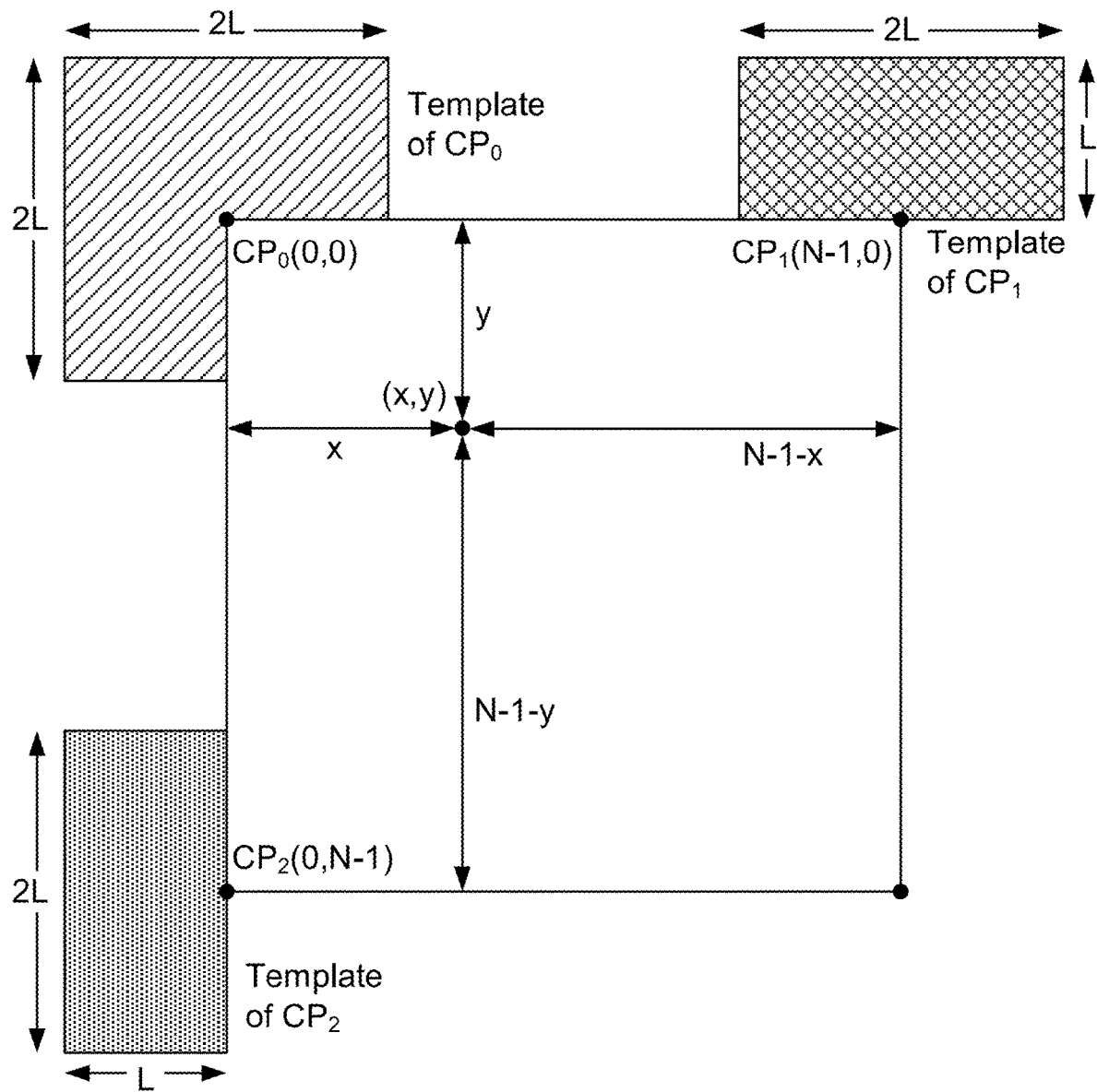
FIG. 13 is a schematic illustration of decoder-side derivation of control intra prediction directions in an exemplary embodiment.

In exemplary methods described above, the control-point's intra directions are signaled from encoder to decoder for the control-point based intra prediction mode, which could consume a non-negligible number of bits and therefore reduce the overall coding performance of the proposed control-point based intra prediction mode. In some embodiments, a decoder-side intra mode derivation (DIMD) approach may be used to reduce the overhead of signaling intra prediction parameters by estimating the intra prediction mode of one video block based on a group of reconstructed neighboring samples (referred to as template) of the current block at the decoder side. To reduce the signaling overhead of controlling intra directions, it is proposed in one embodiment of the disclosure to apply the DIMD approach to the proposed control-point based intra prediction method. In this case, the intra directions of the control points may be derived at the decoder side using DIMD instead of explicitly signaled. Specifically, when the control-point based intra prediction is enabled, instead of indicating control-point's intra directions in bit-stream, the encoder/decoder derives the control-point's intra directions from the reconstructed samples adjacent to the current block. FIG. 13 illustrates the proposed decoder-side control-point derivation method. Given the locations of the selected control-points ($CP_0$, $CP_1$ and $CP_2$), template samples (as indicated by different patterned regions for three control-points) refer to a set of already reconstructed samples that are used to derive the intra prediction direction of the corresponding control-point. Based on the template samples of each control-point, a decoder-side control intra direction derivation method may include a step of calculating, for each intra prediction direction, the cost between the reconstructed template samples and the prediction samples of the template. The template cost may be measured as the distortion between the two. The intra direction that yields the minimum cost may then be selected as the control intra direction.

In different embodiments, different cost measurements may be applied in the decoder-side intra direction derivation method, such as sum of absolute difference (SAD), sum of square difference (SSD) and sum of absolute transformed difference (SATD). The cost may also be measured as the sum of cost measurement of small sub-block unit (e.g. 2×2 or 4×4) contained in the template.

The selection of template samples may be restricted based on the encoding/decoding order of blocks. In FIG. 13, the closest reconstructed samples around each control-point are used as a template. In practice, different template sizes may be used. A large number of template samples can lead to a more reliable estimation of intra direction in the presence of coding noise. However, large template size also increases the distance between the template samples and the control-point position for which the mode is estimated. Therefore, as the distance increases, the accuracy of such estimation may be reduced (given the reduced correlation between the template and the control-point). On the other hand, while a smaller template may provide more accurate estimation, it may be more sensitive to coding noise. Therefore, it is desirable to select an optimal template size for different block sizes, which should be large enough to be robust against noise, while not exceeding the size limit to accurate capture the direction of local edge. In one embodiment, a template size of 2 (i.e., L=2 in FIG. 13) is used for 4×4 and 8×8 blocks and a template size of 4 (i.e., L=4 in FIG. 13) is used for 16×16 and larger video blocks.

In other embodiments of the disclosure, other intra mode derivation methods, including other decoder-side intra mode derivation techniques may be employed in an exemplary control-point based intra prediction method.

Control-Point Based Intra Prediction for Chroma Coding.

Since the human vision system is much more sensitive to variations in brightness than color, a video coding system usually devotes more bits to the luma component than chroma components, e.g., by adjusting the quantization parameter (QP) delta value between luma component and chroma components. Therefore, chroma components contain much less detail information (e.g., edges and textures) than the luma component. Based on this observation, one may signal fewer control points for chroma intra prediction than for luma intra prediction. On the other hand, given the strong correlation between the luma plane and chroma planes, it is highly probable that chroma predication uses the same intra prediction direction as the luma prediction. Therefore, in one embodiment of the disclosure, when the control-point intra prediction mode is enabled for one video block, the encoder/decoder reuses the same control-points of the luma component to derive the intra prediction directions of chroma components, such that the same intra prediction direction will be used for both luma and chroma components. In another embodiment of the disclosure, two different set of control-points are transmitted to decoder for luma and chroma components separately when the control-point based intra prediction mode is enabled.

Intra Prediction Methods Using Control-Point Based Intra Mode Representation.

In exemplary methods described above, control-point based intra prediction is generally performed in such a way that the intra directions of the control-points are firstly used to derive the intra direction for each sample (or sub-block) within the current video block according to Equation (7); then, the existing intra prediction process (as defined in HEVC or JEM) is applied to generate the prediction signal of the current block using the derived intra directions. Reusing the notations in Equation (7) and assuming IP(intraDir) is the function of performing intra prediction using intra prediction direction intraDir, the control-point based intra prediction process as mentioned above can be described as $$IP(IM(x, y)) = IP\left(\sum_{i=0}^{K-1} (\phi_i(x, y)IM(CP_i))\right) \quad (21)$$

In some embodiments, intra prediction operation IP(•) can be closely approximated as a linear function, and Equation (21) can be expressed in approximate form as follows $$IP(IM(x, y)) = IP\left(\sum_{i=0}^{K-1} (\phi_i(x, y)IM(CP_i))\right) \approx \sum_{i=0}^{K-1} IP(\phi_i(x, y)IM(CP_i)) \approx \sum_{i=0}^{K-1} \phi_i(x, y)IP(IM(CP_i)) \quad (22)$$

Figure 14:
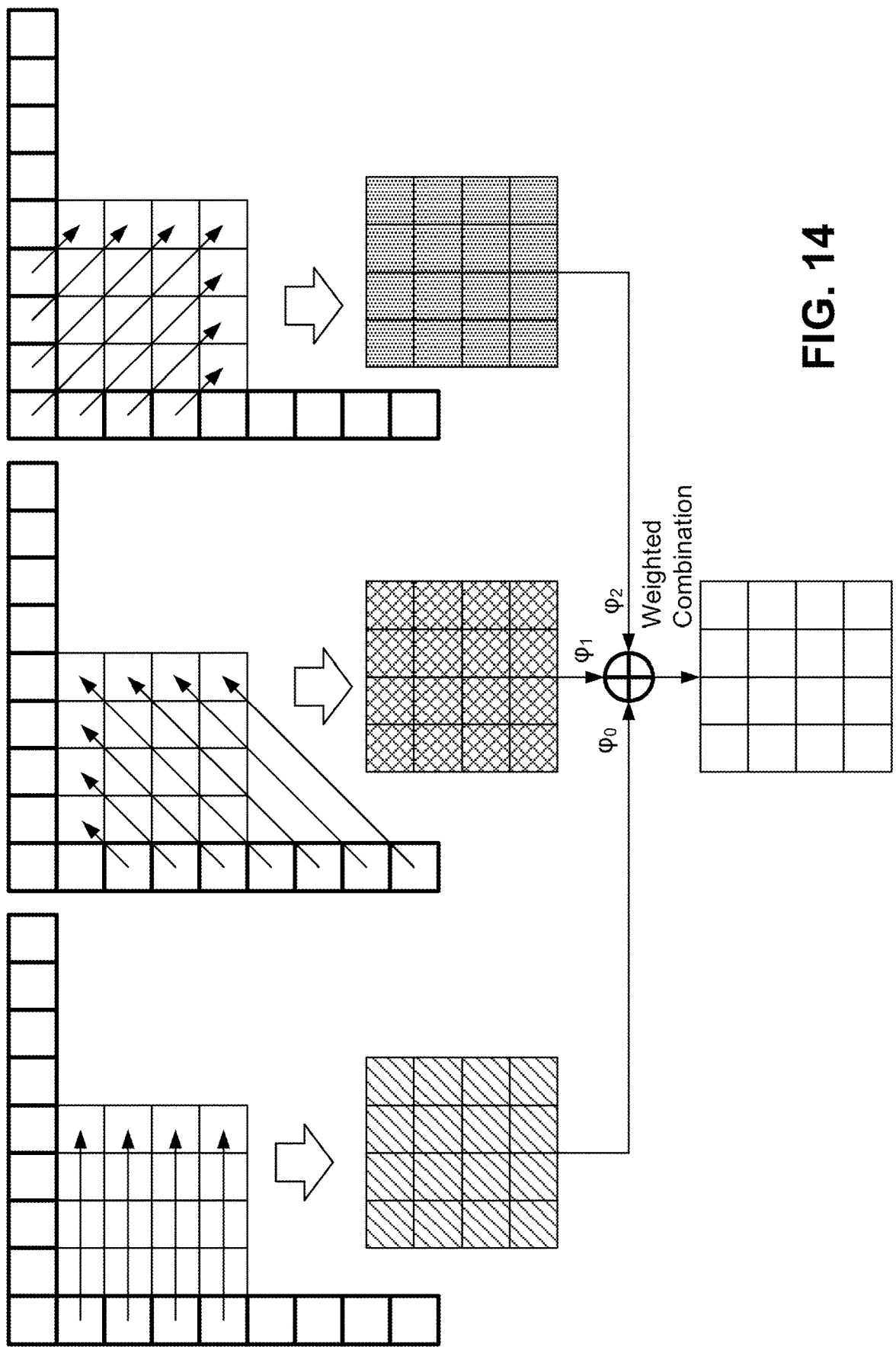
FIG. 14 is a schematic illustration of generation of intra prediction samples using a weighted combination of intra prediction signals using the intra directions of control-points.

In this equation, $IP(IM(CP_i))$ corresponds to applying intra prediction to one sample using the intra direction of the control-point $CP_i$. Therefore, based on Equation (22), another intra prediction method may be employed using the proposed control-point based intra prediction method. In this method, given K control-points $CP_i$, i=0,1,K−1, the encoder/decoder firstly generates K different intra prediction signals for the current block, each using the intra prediction direction of one control-point, $IM(CP_i)$, respectively; then, the final intra prediction is obtained by employing weighted combination of these K control-point based intra prediction signals ($IM(CP_i)$) where the weight may be calculated according to the interpolation kernel function as specified in Equation (7). In a case in which three control points are used for the current block (K=3), FIG. 14 shows one example to illustrate the weighted combination of intra prediction signals using the intra directions of control-points. In Equation (22), the weight factor is dependent on the location of the target sample (x,y). In another embodiment, other weight factors (e.g., not position-dependent or not using the kernel functions) may be applied in Equation (22) to combine intra prediction signals generated with the direction from different control-points.

As compared to methods using Equation (7), a control-point based intra prediction method using Equation (22) allows the intra prediction directions at the control points to be non-angular direction modes, such as, DC and planar. Therefore, when MPM-based intra mode prediction is applied to predict the controlling intra directions, the MPM candidate list may be generated by including both angular and non-angular intra directions.

Figure 15:
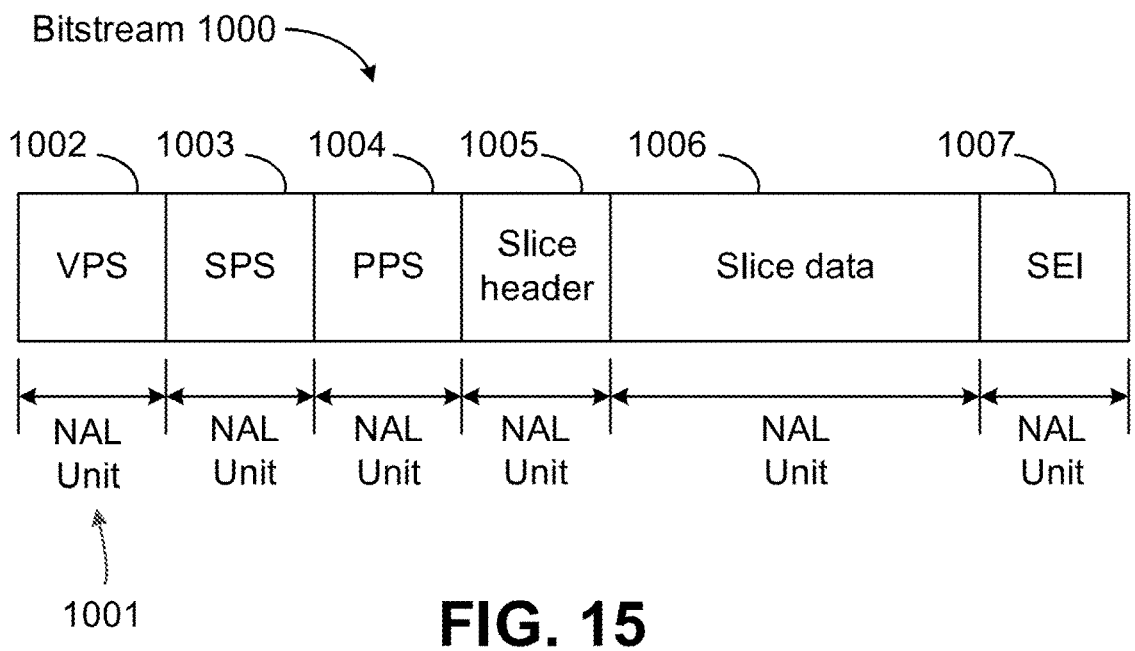
FIG. 15 is a diagram illustrating an example of a coded bitstream structure.

FIG. 15 is a schematic diagram illustrating an example of a coded bitstream structure. A coded bitstream 1000 consists of a number of NAL (Network Abstraction layer) units 1001. A NAL unit may contain coded sample data such as coded slice 1006, or high level syntax metadata such as parameter set data, slice header data 1005 or supplemental enhancement information data 1007 (which may be referred to as an SEI message). Parameter sets are high level syntax structures containing essential syntax elements that may apply to multiple bitstream layers (e.g. video parameter set 1002 (VPS)), or may apply to a coded video sequence within one layer (e.g. sequence parameter set 1003 (SPS)), or may apply to a number of coded pictures within one coded video sequence (e.g. picture parameter set 1004 (PPS)). The parameter sets can be either sent together with the coded pictures of the video bit stream, or sent through other means (including out-of-band transmission using reliable channels, hard coding, etc.). Slice header 1005 is also a high level syntax structure that may contain some picture-related information that is relatively small or relevant only for certain slice or picture types. SEI messages 1007 carry the information that may not be needed by the decoding process but can be used for various other purposes such as picture output timing or display as well as loss detection and concealment.

Figure 16:
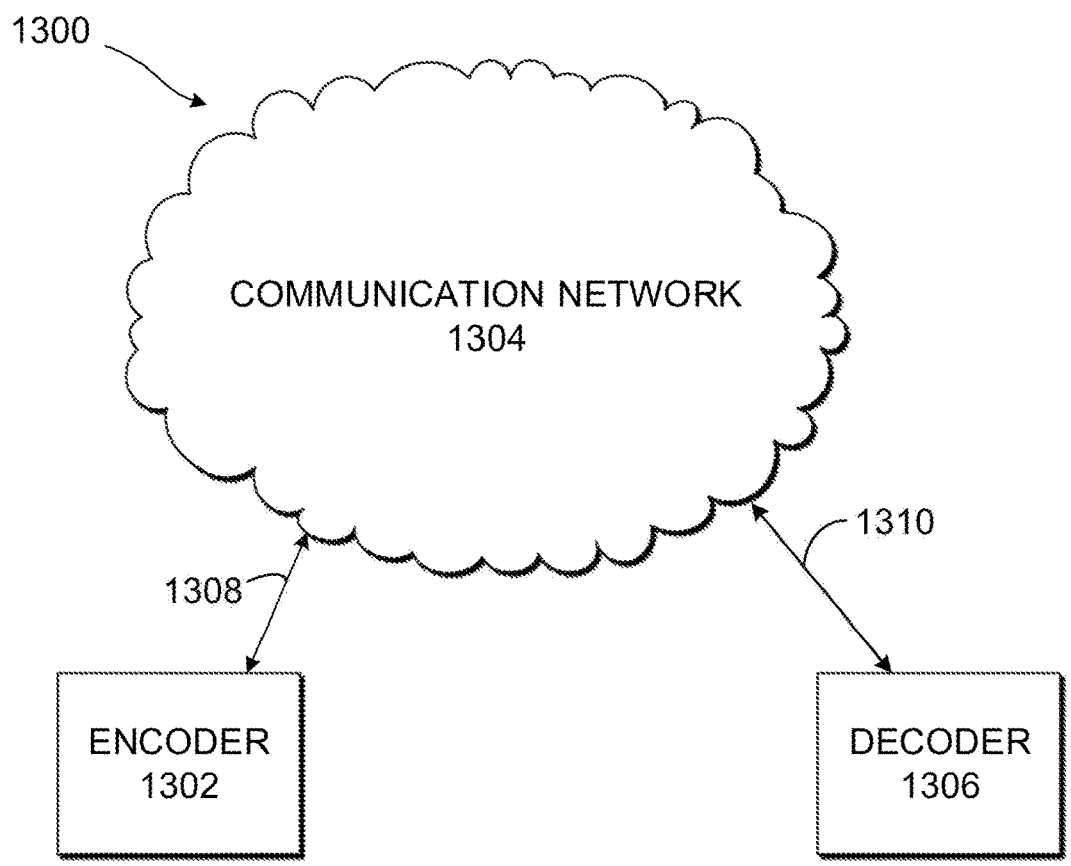
FIG. 16 is a diagram illustrating an example communication system.

FIG. 16 is a schematic diagram illustrating an example of a communication system.

The communication system 1300 may comprise an encoder 1302, a communication network 1304, and a decoder 1306. The encoder 1302 may be in communication with the network 1304 via a connection 1308, which may be a wireline connection or a wireless connection. The encoder 1302 may be similar to the block-based video encoder of FIG. 1. The encoder 1302 may include a single layer codec (e.g., FIG. 1) or a multilayer codec. For example, the encoder 1302 may be a multi-layer (e.g., two-layer) scalable coding system with picture-level ILP support. The decoder 1306 may be in communication with the network 1304 via a connection 1310, which may be a wireline connection or a wireless connection. The decoder 1306 may be similar to the block-based video decoder of FIG. 2. The decoder 1306 may include a single layer codec (e.g., FIG. 2) or a multilayer codec. For example, the decoder 1306 may be a multi-layer (e.g., two-layer) scalable decoding system with picture-level ILP support.

The encoder 1302 and/or the decoder 1306 may be incorporated into a wide variety of wired communication devices and/or wireless transmit/receive units (WTRUs), such as, but not limited to, digital televisions, wireless broadcast systems, a network element/terminal, servers, such as content or web servers (e.g., such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and/or the like.

The communications network 1304 may be a suitable type of communication network. For example, the communications network 1304 may be a multiple access system that provides content, such as voice, data, video, messaging, broadcast, etc., to multiple wireless users. The communications network 1304 may enable multiple wireless users to access such content through the sharing of system resources, including wireless bandwidth. For example, the communications network 1304 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like. The communication network 1304 may include multiple connected communication networks. The communication network 1304 may include the Internet and/or one or more private commercial networks such as cellular networks, WiFi hotspots, Internet Service Provider (ISP) networks, and/or the like.

Figure 17:
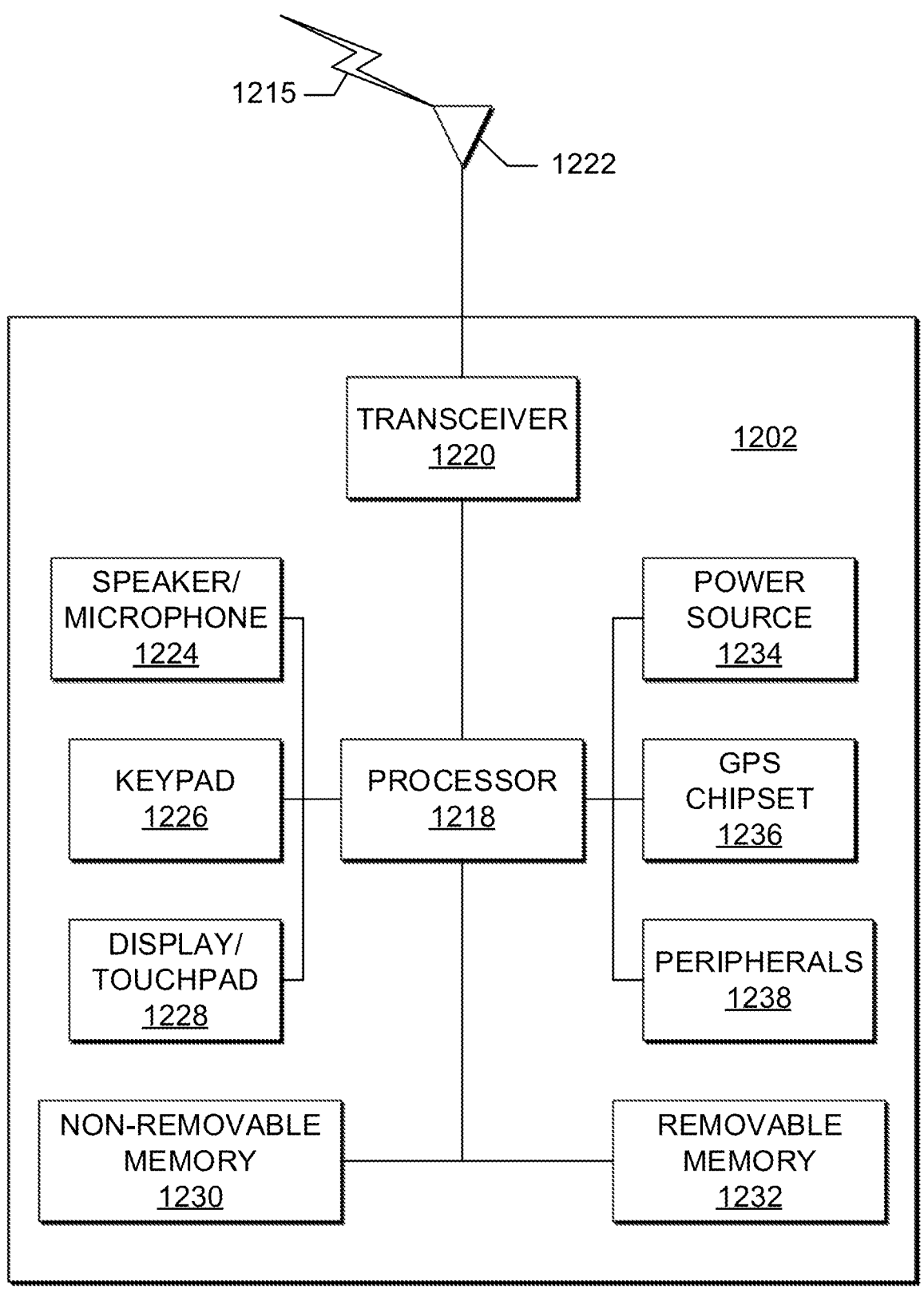
FIG. 17 is a diagram illustrating an example wireless transmit/receive unit (WTRU), which may be used as an encoder or decoder in some embodiments.

FIG. 17 is a system diagram of an example WTRU in which an encoder or decoder as described herein may be implemented. As shown the example WTRU 1202 may include a processor 1218, a transceiver 1220, a transmit/receive element 1222, a speaker/microphone 1224, a keypad or keyboard 1226, a display/touchpad 1228, non-removable memory 1230, removable memory 1232, a power source 1234, a global positioning system (GPS) chipset 1236, and/or other peripherals 1238. It will be appreciated that the WTRU 1202 may include any sub-combination of the foregoing elements while remaining consistent with an embodiment. Further, a terminal in which an encoder (e.g., encoder 100) and/or a decoder (e.g., decoder 200) is incorporated may include some or all of the elements depicted in and described herein with reference to the WTRU 1202 of FIG. 17.

The processor 1218 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1218 may perform signal coding, data processing, power control, input/output processing, and/or any other functionality that enables the WTRU 1500 to operate in a wired and/or wireless environment. The processor 1218 may be coupled to the transceiver 1220, which may be coupled to the transmit/receive element 1222. While FIG. 17 depicts the processor 1218 and the transceiver 1220 as separate components, it will be appreciated that the processor 1218 and the transceiver 1220 may be integrated together in an electronic package and/or chip.

The transmit/receive element 1222 may be configured to transmit signals to, and/or receive signals from, another terminal over an air interface 1215. For example, in one or more embodiments, the transmit/receive element 1222 may be an antenna configured to transmit and/or receive RF signals. In one or more embodiments, the transmit/receive element 1222 may be an emitter/detector configured to transmit and/or receive IR, UV, or visible light signals, for example. In one or more embodiments, the transmit/receive element 1222 may be configured to transmit and/or receive both RF and light signals. It will be appreciated that the transmit/receive element 1222 may be configured to transmit and/or receive any combination of wireless signals.

In addition, although the transmit/receive element 1222 is depicted in FIG. 17 as a single element, the WTRU 1202 may include any number of transmit/receive elements 1222. More specifically, the WTRU 1202 may employ MIMO technology. Thus, in one embodiment, the WTRU 1202 may include two or more transmit/receive elements 1222 (e.g., multiple antennas) for transmitting and receiving wireless signals over the air interface 1215.

The transceiver 1220 may be configured to modulate the signals that are to be transmitted by the transmit/receive element 1222 and/or to demodulate the signals that are received by the transmit/receive element 1222. As noted above, the WTRU 1202 may have multi-mode capabilities. Thus, the transceiver 1220 may include multiple transceivers for enabling the WTRU 1500 to communicate via multiple RATs, such as UTRA and IEEE 802.11, for example.

The processor 1218 of the WTRU 1202 may be coupled to, and may receive user input data from, the speaker/microphone 1224, the keypad 1226, and/or the display/touchpad 1228 (e.g., a liquid crystal display (LCD) display unit or organic light-emitting diode (OLED) display unit). The processor 1218 may also output user data to the speaker/microphone 1224, the keypad 1226, and/or the display/touchpad 1228. In addition, the processor 1218 may access information from, and store data in, any type of suitable memory, such as the non-removable memory 1230 and/or the removable memory 1232. The non-removable memory 1230 may include random-access memory (RAM), read-only memory (ROM), a hard disk, or any other type of memory storage device. The removable memory 1232 may include a subscriber identity module (SIM) card, a memory stick, a secure digital (SD) memory card, and the like. In one or more embodiments, the processor 1218 may access information from, and store data in, memory that is not physically located on the WTRU 1202, such as on a server or a home computer (not shown).

The processor 1218 may receive power from the power source 1234, and may be configured to distribute and/or control the power to the other components in the WTRU 1202. The power source 1234 may be any suitable device for powering the WTRU 1202. For example, the power source 1234 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1218 may be coupled to the GPS chipset 1236, which may be configured to provide location information (e.g., longitude and latitude) regarding the current location of the WTRU 1202. In addition to, or in lieu of, the information from the GPS chipset 1236, the WTRU 1202 may receive location information over the air interface 1215 from a terminal (e.g., a base station) and/or determine its location based on the timing of the signals being received from two or more nearby base stations. It will be appreciated that the WTRU 1202 may acquire location information by way of any suitable location-determination method while remaining consistent with an embodiment.

The processor 1218 may further be coupled to other peripherals 1238, which may include one or more software and/or hardware modules that provide additional features, functionality and/or wired or wireless connectivity. For example, the peripherals 1238 may include an accelerometer, orientation sensors, motion sensors, a proximity sensor, an e-compass, a satellite transceiver, a digital camera and/or video recorder (e.g., for photographs and/or video), a universal serial bus (USB) port, a vibration device, a television transceiver, a hands free headset, a Bluetooth® module, a frequency modulated (FM) radio unit, and software modules such as a digital music player, a media player, a video game player module, an Internet browser, and the like.

By way of example, the WTRU 1202 may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a tablet computer, a personal computer, a wireless sensor, consumer electronics, or any other terminal capable of receiving and processing compressed video communications.

The WTRU 1202 and/or a communication network (e.g., communication network 804) may implement a radio technology such as Universal Mobile Telecommunications System (UMTS) Terrestrial Radio Access (UTRA), which may establish the air interface 1215 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA). The WTRU 1202 and/or a communication network (e.g., communication network 804) may implement a radio technology such as Evolved UMTS Terrestrial Radio Access (E-UTRA), which may establish the air interface 1515 using Long Term Evolution (LTE) and/or LTE-Advanced (LTE-A).

The WTRU 1202 and/or a communication network (e.g., communication network 804) may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like. The WTRU 1500 and/or a communication network (e.g., communication network 804) may implement a radio technology such as IEEE 802.11, IEEE 802.15, or the like.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method comprising:
for at least a current block, identifying at least a first intra direction for a first control point and a second intra direction for a second control point;
for at least one current sample in the current block, deriving an intra prediction direction for the sample by interpolating a direction from at least the first intra direction and the second intra direction; and
predicting the at least one current sample with intra prediction using the derived intra prediction direction.

2. The method of claim 1, wherein the derived intra prediction direction is interpolated from the first intra direction, the second intra direction, and a third intra direction for a third control point.

3. The method of claim 1, wherein positions of at least the first control point and the second control point are signaled in a bitstream.

4. The method of claim 1, wherein at least the first intra direction is signaled in a bitstream.

5. The method of claim 1, wherein at least the first and second control points are selected from the group consisting of: a control point at a top-left corner of the current block, a control point at a top-right corner of the current block, a control point at a bottom-left corner of the current block, a control point at a bottom-right corner of the current block, and a custom control point signaled in a bitstream.

6. The method of claim 1, wherein the first control point is at a top-left corner of the current block and the second control point is at a top-right corner or a bottom-left corner of the current block.

7. The method of claim 6, wherein a position of the second control point is determined based on intra modes in a list of most probable modes for the current block, the list being determined based on intra modes used to code neighboring blocks and wherein:
the second control point is at a top-right corner of the current block if more of the most probable modes are horizontal than vertical; and
the second control point is at a bottom-left corner of the current block if more of the most probable modes are vertical than horizontal.

8. The method of claim 1, wherein the current sample is in a current sub-block of the current block, further comprising predicting all samples of the current sub-block using the derived intra prediction direction.

9. The method of claim 8, wherein the current block includes a plurality of sub-blocks of samples, the method further comprising:

deriving respective intra prediction directions for each of the sub-blocks by interpolating respective directions from at least the first intra direction and the second intra direction; and
predicting samples in each of the sub-blocks by intra prediction using the respective derived intra prediction direction.

10. The method of claim 1, wherein the first and second intra directions are selected from a list of most probable modes, the list being determined based on intra modes used to code neighboring blocks.

11. The method of claim 1, wherein at least the second intra direction is coded in a bitstream using differential coding with respect to the first intra direction.

12. The method of claim 1, wherein the interpolating is performed using triangular interpolation.

13. The method of claim 1, wherein the interpolating is performed using bilinear interpolation.

14. The method of claim 1, wherein a bitstream includes a flag indicating that control-point intra coding is used for the current block.

15. The method of claim 1, performed by a video encoder, the method further comprising determining a prediction residual for the at least one current sample and encoding the prediction residual in a bitstream.

16. The method of claim 1, performed by a video decoder, the method further comprising decoding a prediction residual for the at least one current sample and reconstructing the sample using a predicted value of the at least one current sample and the prediction residual.

17. An apparatus comprising:
a processor configured to perform at least:
for at least a current block, identifying at least a first intra direction for a first control point and a second intra direction for a second control point;
for at least one current sample in the current block, deriving an intra prediction direction for the sample by interpolating a direction from at least the first intra direction and the second intra direction; and
predicting the at least one current sample with intra prediction using the derived intra prediction direction.

18. The apparatus of claim 17, wherein the derived intra prediction direction is interpolated from the first intra direction, the second intra direction, and a third intra direction for a third control point.

19. The apparatus of claim 17, wherein the first control point is at a top-left corner of the current block and the second control point is at a top-right corner or a bottom-left corner of the current block.

20. The apparatus of claim 17, wherein the current sample is in a current sub-block of the current block, further comprising predicting all samples of the current sub-block using the derived intra prediction direction.

* * * * *